United States Patent
Ishihara et al.

(10) Patent No.: US 12,380,667 B2
(45) Date of Patent: Aug. 5, 2025

(54) REFERENCE STATE DECIDING DEVICE, STATE DETERMINATION SYSTEM, REFERENCE STATE DECIDING METHOD, AND NON-TRANSITORY COMPUTER READABLE MEDIUM

(71) Applicant: NEC Corporation, Tokyo (JP)

(72) Inventors: Kenta Ishihara, Tokyo (JP); Shoji Nishimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 247 days.

(21) Appl. No.: 18/020,373

(22) PCT Filed: Aug. 19, 2020

(86) PCT No.: PCT/JP2020/031239
§ 371 (c)(1),
(2) Date: Feb. 8, 2023

(87) PCT Pub. No.: WO2022/038705
PCT Pub. Date: Feb. 24, 2022

(65) Prior Publication Data
US 2023/0316701 A1 Oct. 5, 2023

(51) Int. Cl.
*G06K 9/00* (2022.01)
*G06F 18/213* (2023.01)
(Continued)

(52) U.S. Cl.
CPC ............ *G06V 10/44* (2022.01); *G06F 18/213* (2023.01); *G06T 7/20* (2013.01); *G06T 7/70* (2017.01);
(Continued)

(58) Field of Classification Search
CPC ........ G06V 10/00; G06V 10/22; G06V 10/25; G06V 10/255; G06V 10/40; G06V 10/42;
(Continued)

(56) References Cited

U.S. PATENT DOCUMENTS

| | | | |
|---|---|---|---|
| 7,433,493 B1 * | 10/2008 | Miyoshi | G06V 20/52 382/103 |
| 2006/0195199 A1 * | 8/2006 | Iwasaki | G06V 20/53 700/1 |

(Continued)

FOREIGN PATENT DOCUMENTS

| | | | |
|---|---|---|---|
| JP | 2004-128962 A | 4/2004 | |
| JP | 2007-328435 A | 12/2007 | |

(Continued)

OTHER PUBLICATIONS

International Search Report for PCT Application No. PCT/JP2020/031239, mailed on Nov. 2, 2020.

*Primary Examiner* — Eric Rush

(57) ABSTRACT

A reference state deciding device (10) according to the present disclosure includes a feature calculation unit (11) that calculates an object feature related to a target object of state determination included in a real space and an imaged space feature related to the real space on the basis of past image data of the real space imaged in the past and target image data of the real space imaged at the time of the state determination, and a reference state deciding unit (12) that decides a reference state to be used for the state determination on the basis of a relation between the object feature and the imaged space feature calculated from the past image data and the target image data.

18 Claims, 13 Drawing Sheets

(51) Int. Cl.
| | |
|---|---|
| *G06T 7/20* | (2017.01) |
| *G06T 7/70* | (2017.01) |
| *G06V 10/42* | (2022.01) |
| *G06V 10/44* | (2022.01) |
| *G06V 10/46* | (2022.01) |
| *G06V 10/70* | (2022.01) |
| *G06V 10/74* | (2022.01) |
| *G06V 10/762* | (2022.01) |
| *G06V 10/77* | (2022.01) |
| *G06V 20/52* | (2022.01) |
| *G06V 20/56* | (2022.01) |
| *G08B 21/04* | (2006.01) |

(52) U.S. Cl.
CPC ............ *G06V 10/42* (2022.01); *G06V 10/467* (2022.01); *G06V 10/74* (2022.01); *G06V 10/761* (2022.01); *G06V 10/762* (2022.01); *G06V 10/768* (2022.01); *G06V 10/7715* (2022.01); *G06V 20/52* (2022.01); *G06V 20/56* (2022.01); *G08B 21/0423* (2013.01); *G06T 2207/30232* (2013.01); *G06T 2207/30242* (2013.01); *G06T 2207/30252* (2013.01)

(58) Field of Classification Search
CPC ...... G06V 10/44; G06V 10/46; G06V 10/464; G06V 10/467; G06V 10/469; G06V 10/48; G06V 10/62; G06V 10/70; G06V 10/72; G06V 10/74; G06V 10/75; G06V 10/76; G06V 10/761; G06V 10/762; G06V 10/764; G06V 10/768; G06V 10/77; G06V 10/771; G06V 10/7715; G06V 10/772; G06V 20/40; G06V 20/41; G06V 20/46; G06V 20/50; G06V 20/52; G06V 20/53; G06V 20/54; G06V 20/56; G06V 20/58; G06V 20/582; G06V 20/584; G06V 20/586; G06V 20/588; G06V 40/10; G06V 40/16; G06V 40/174; G06V 40/175; G06V 40/176; G06V 40/179; G06V 40/20; G06V 40/23; G06V 40/25; G06V 40/28; G06V 2201/06; G06V 2201/07; G06T 7/00; G06T 7/20; G06T 7/70; G06T 7/97; G06T 2207/20081; G06T 2207/20084; G06T 2207/30196; G06T 2207/30221; G06T 2207/30228; G06T 2207/30232; G06T 2207/30242; G06T 2207/30248; G06T 2207/30252; G06T 2207/30256; G06T 2207/30261; G06T 2207/30264; G06T 2207/30268; G06F 18/21; G06F 18/211; G06F 18/2115; G06F 18/213; G06F 18/23; G06F 18/231; G06F 18/232; G06F 18/2321; G06F 18/23211; G06F 18/23213; G06F 18/28; G08B 13/19604; G08B 13/19606; G08B 13/19608; G08B 13/1961; G08B 13/19613; G08B 21/0407; G08B 21/0415; G08B 21/0423; G08B 21/0438; G08B 21/0476; G08G 1/0125; G08G 1/0129; G08G 1/0133; G08G 1/0137; G08G 1/017; G08G 1/0175
USPC ................ 382/100, 103, 104, 107, 115, 118, 382/153–155, 159, 160, 173, 181, 382/190–192, 195, 199, 203, 205, 206, 382/209, 215–220, 224–229, 236, 28, 382/239, 278, 282, 286, 288, 291, 325; 348/61, 62, 113, 135, 143, 148–157, 161, 348/169–172; 340/425.5, 500, 501, 540, 340/541, 573.1, 573.7, 933–937, 944

See application file for complete search history.

(56) References Cited

U.S. PATENT DOCUMENTS

| | | | |
|---|---|---|---|
| 2012/0243739 A1* | 9/2012 | Fukuchi | G06V 10/60 |
| | | | 382/103 |
| 2013/0113934 A1 | 5/2013 | Hotta et al. | |
| 2019/0221090 A1* | 7/2019 | Beiser | G06V 10/764 |
| 2020/0327313 A1* | 10/2020 | Kedarisetti | G06V 10/758 |

FOREIGN PATENT DOCUMENTS

| | | |
|---|---|---|
| JP | 2018-173914 A | 11/2018 |
| WO | 2012/008176 A1 | 1/2012 |

* cited by examiner

REFERENCE STATE DECIDING DEVICE, STATE DETERMINATION SYSTEM, REFERENCE STATE DECIDING METHOD, AND NON-TRANSITORY COMPUTER READABLE MEDIUM

This application is a National Stage Entry of PCT/JP2020/031239 filed on Aug. 19, 2020, the contents of all of which are incorporated herein by reference, in their entirety.

TECHNICAL FIELD

The present invention relates to a reference state deciding device, a state determination system, a reference state deciding method, and a non-transitory computer readable medium.

BACKGROUND ART

It is important to detect, from a surveillance image, an abnormal state of a person such as abnormal staying (abnormal congestion, hanging out, crowding around, etc.) and crowd dashing, riot, etc., in an emergency situation in an environment (crowded environment) where an indefinite number of people come and go. Techniques to determine a state of a person in a surveillance space from a difference between information about the person calculated from a surveillance image and information about the person at a previously set reference time are proposed. Patent Literature 1, for example is known as related art.

CITATION LIST

Patent Literature

[Patent Literature 1] International Patent Publication No. WO 2012/008176

SUMMARY OF INVENTION

Technical Problem

The technique disclosed in Patent Literature 1 performs state determination on the basis of a difference between motion information of a plurality of mobile objects in a surveillance space and a previously decided reference state. The present inventor has found that, in the technique disclosed in Patent Literature 1, the accuracy of determination can decrease depending on a preset reference state. Specifically, a state to be set as a reference state is different depending on the situation of a space being imaged. However, since a reference state is previously set in a fixed manner in the technique disclosed in Patent Literature 1, no consideration is given to deciding a reference state in accordance with the situation. Therefore, the technique disclosed in Patent Literature 1 is incapable of appropriately deciding a reference state for state determination.

In view of the above problem, an object of the present disclosure is to provide a reference state deciding device, a state determination system, a reference state deciding method, and a non-transitory computer readable medium capable of appropriately deciding a reference state for state determination.

Solution to Problem

A reference state deciding device according to a first aspect includes a feature calculation means for calculating an object feature related to a target object of state determination included in a real space and an imaged space feature related to the real space on the basis of past image data of the real space imaged in the past and target image data of the real space imaged at the time of the state determination, and a reference state deciding means for deciding a reference state to be used for the state determination on the basis of a relation between the object feature and the imaged space feature calculated from the past image data and the target image data.

A state determination system according to a second aspect includes a feature calculation means for calculating an object feature related to a target object of state determination included in a real space and an imaged space feature related to the real space on the basis of past image data of the real space imaged in the past and target image data of the real space imaged at the time of the state determination, a reference state deciding means for deciding a reference state to be used for the state determination on the basis of a relation between the object feature and the imaged space feature calculated from the past image data and the target image data, and a state determination means for determining a state of the target object on the basis of the decided reference state.

A reference state deciding method according to a third aspect includes calculating an object feature related to a target object of state determination included in a real space and an imaged space feature related to the real space on the basis of past image data of the real space imaged in the past and target image data of the real space imaged at the time of the state determination, and deciding a reference state to be used for the state determination on the basis of a relation between the object feature and the imaged space feature calculated from the past image data and the target image data.

A non-transitory computer readable medium according to a fourth aspect is a non-transitory computer readable medium storing a program causing a computer to execute a process including calculating an object feature related to a target object of state determination included in a real space and an imaged space feature related to the real space on the basis of past image data of the real space imaged in the past and target image data of the real space imaged at the time of the state determination, and deciding a reference state to be used for the state determination on the basis of a relation between the object feature and the imaged space feature calculated from the past image data and the target image data.

Advantageous Effects of Invention

According to the present disclosure, there are provided a reference state deciding device, a state determination system, a reference state deciding method, and a non-transitory computer readable medium capable of appropriately deciding a reference state for state determination.

EXAMPLE EMBODIMENT

Example embodiments are described hereinafter with reference to the drawings. It should be noted that, in each drawing, the same or equivalent elements are denoted by the same reference symbols, and the redundant explanation thereof is omitted.

Study of Related Art

The above-described Patent Literature 1 will be studied first as related art before application of an example embodiment. The technique disclosed in Patent Literature 1 calculates motion information of a plurality of mobile objects in a surveillance space and aggregates the direction of motion. It then calculates the degree of concentration in two directions where motion frequently occurs among the aggregate directions, the angle between the two directions, and the ratio of motion in the two directions, and makes a determination between normal and abnormal by using those three types of evaluation values. For this determination, a difference between aggregate motion information and a previously decided reference state is used. In Patent Literature 1, if, for example, motion information at normal time is set as a reference state, it is determined as an abnormal state when the difference is a certain value or more, and if, on the other hand, motion information at abnormal time is set as a reference state, a determination result is opposite to the above one.

Further, in the technique disclosed in Patent Literature 1, there is a state where a determination is difficult due to a preset reference state. For example, when conducting surveillance of a space that is frequently crowded such as a station platform, if an uncrowded (normal) state is previously set as a reference state, there is a possibility that a normal crowded state that often occurs is erroneously determined to be abnormal. Further, when conducting surveillance of an intersection with traffic lights, if a (normal) state where one traffic light is green is previously set as a reference state, there is a possibility that people's motion in a state where the other traffic light is green is erroneously determined to be abnormal.

In view of the above, the following example embodiments enable improvement of the determination accuracy by deciding a reference state suitable for the situation of a real space being imaged.

It should be noted that, although a target object of state determination is a person in the following description, the target is not limited to a person, and it may be another animal or any object such as a bicycle or an automobile.

First Example Embodiment

Figure 1:
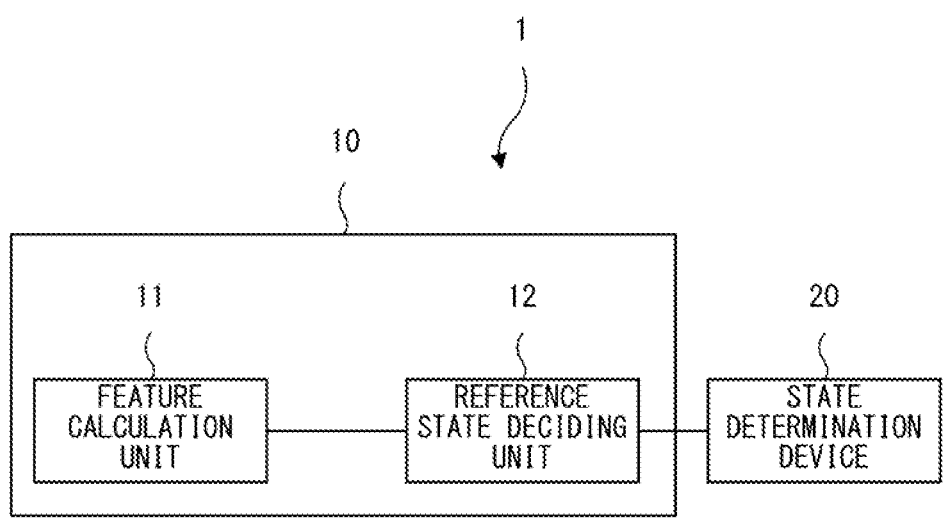
FIG. 1 is a block diagram showing an example of a reference state deciding system including a reference state deciding device according to a first example embodiment.

FIG. 1 is a block diagram showing an example of a reference state deciding system (state determination system) including a reference state deciding device according to a first example embodiment. The reference state deciding system in this example embodiment is a system that decides a reference state suitable for the situation of a real space being imaged and determines a state of an imaged target object on the basis of the decided reference state. As shown in FIG. 1, a reference state deciding system 1 includes a reference state deciding device 10 and a state determination device 20.

The reference state deciding device 10 is a device that decides a reference state for state determination on the basis of an image captured by a camera (imaging device) such as a surveillance camera. The reference state deciding device 10 includes a feature calculation unit 11 and a reference state deciding unit 12.

The feature calculation unit 11 calculates an object feature related to a target object of state determination and an imaged space feature related to a real space being imaged on the basis of an "image" obtained by imaging the real space and information about "imaging time" of this image. The image and the imaging time are collectively referred to as image data in some cases. The feature calculation unit 11 acquires image data captured in the past (which is referred to as past image data) and image data captured at the time of state determination and used for state determination (which is referred to as target image data), and calculates the object feature and the imaged space feature on the basis of the acquired image data. The past may be any timing before state determination. The past image data includes a plurality of "images" acquired in the past and accumulated and the "imaging time" of those images.

The object feature is the number of target objects (e.g., persons), the position of the target object, the moving speed of the target object, the attribute of the target object and the like, for example, and any one of those features may be calculated, or any plurality of features may be calculated as an object feature vector. The imaged space feature is an object other than the target object in the real space being imaged, an image feature calculated from a rectangular region including this another object, the position of this another object, the moving speed of this another object, the weather in the real space, the imaging time, an event in the real space and the like, for example, and any one of those features may be calculated, or any plurality of features may be calculated as an imaged space feature vector.

The reference state deciding unit 12 extracts the relation between two features on the basis of the object feature and the imaged space feature calculated from the past image data and the target image data by the feature calculation unit 11, and decides, from this relation, a reference state of the target object to be used for state determination suitable for the situation of the real space. For example, the reference state deciding unit 12 may decide a reference state on the basis of the correlation or co-occurrence between the object feature and the imaged space feature. The reference state deciding unit 12 extracts the relation between two features from the past image data and further extracts the relation between two features from the target image data. It then decides the feature of a reference state on the basis of the relation between two features in the past image data and the relation between two features in the target image data.

The state determination device 20 determines the state of the target object in the image at the time of state determination on the basis of the reference state decided by the reference state deciding unit 12. The state determination device 20 operates upon receiving input of the target image data at the time of state determination, and determines whether it is a state different from the reference state or the same state as the reference state on the basis of a difference between the reference state calculated by the reference state deciding unit 12 and the object feature calculated from the target image data by the feature calculation unit 11. For example, when image data in a "normal" state is accumulated in the past, the reference state calculated by the reference state deciding unit 12 can be regarded as a "reference at normal time" in accordance with the situation of various imaging spaces. Thus, when a difference between the reference stage and the object feature is a certain value or more, it is determined as an abnormal state. On the other hand, when image data in an abnormal state is accumulated in the past, the above-described determination result is opposite.

Although the state determination device 20 is a separate device from the reference state deciding device 10 in FIG. 1, it is not limited thereto. For example, the reference state deciding device 10 may include the state determination device 20.

As described above, in the first example embodiment, according to the above-described configuration of the reference state deciding device 10, the reference state is decided on the basis of the relation between the object feature related to the target object of a captured image and the imaged space feature related to the real space whose image is captured. This allows deciding the reference state suitable for the situation of the real space shown in the acquired image in consideration of the situation of the space being imaged, the time period and the like. This enables improvement of the accuracy of state determination of the target object shown in the image.

Second Example Embodiment

In a second example embodiment, an example of using the correlation between the object feature and the imaged space feature as the relation between the object feature and the imaged space feature to be taken into consideration when deciding the reference state in the first example embodiment is described.

<Configuration Example of Reference State Deciding System>

Figure 2:
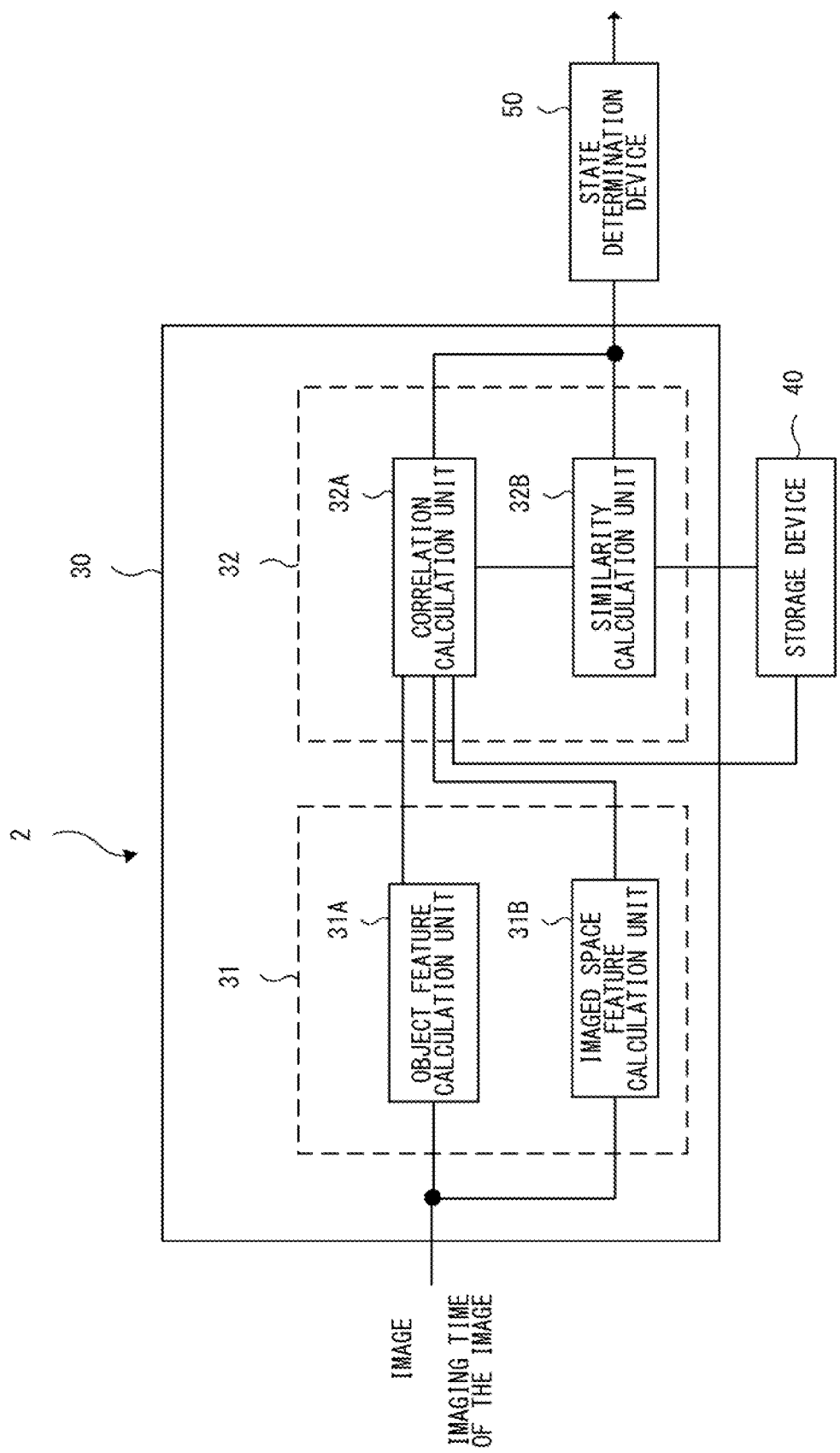
FIG. 2 is a block diagram showing an example of a reference state deciding system including a reference state deciding device according to a second example embodiment.

FIG. 2 is a block diagram showing an example of a reference state deciding system (state determination system) including a reference state deciding device according to the second example embodiment. As shown in FIG. 2, a reference state deciding system 2 includes a reference state deciding device 30, a storage device 40, and a state determination device 50.

The reference state deciding device 30 includes a feature calculation unit 31 and a reference state deciding unit 32.

The feature calculation unit 31 calculates an object feature and an imaged space feature from image data containing an "image" obtained by imaging a real space and "imaging time" of this image, just like the feature calculation unit 11 in the first example embodiment. The feature calculation unit 31 acquires past image data prior to state determination, and further acquires target image data at the time of state determination. For example, past image data obtained by imaging a real space by a camera in the past is accumulated in a database, and the feature calculation unit 31 acquires the accumulated past image data from this database. Further, at the time of state determination, the feature calculation unit 31 acquires target image data obtained by imaging the same real space from the camera.

For example, as shown in FIG. 2, the feature calculation unit 31 includes an object feature calculation unit 31A and an imaged space feature calculation unit 31B.

The object feature calculation unit 31A calculates object features from the "image" contained in the acquired past image data or target image data. The object feature calculation unit 31A then outputs the calculated object features collectively as one feature vector.

Figure 3:
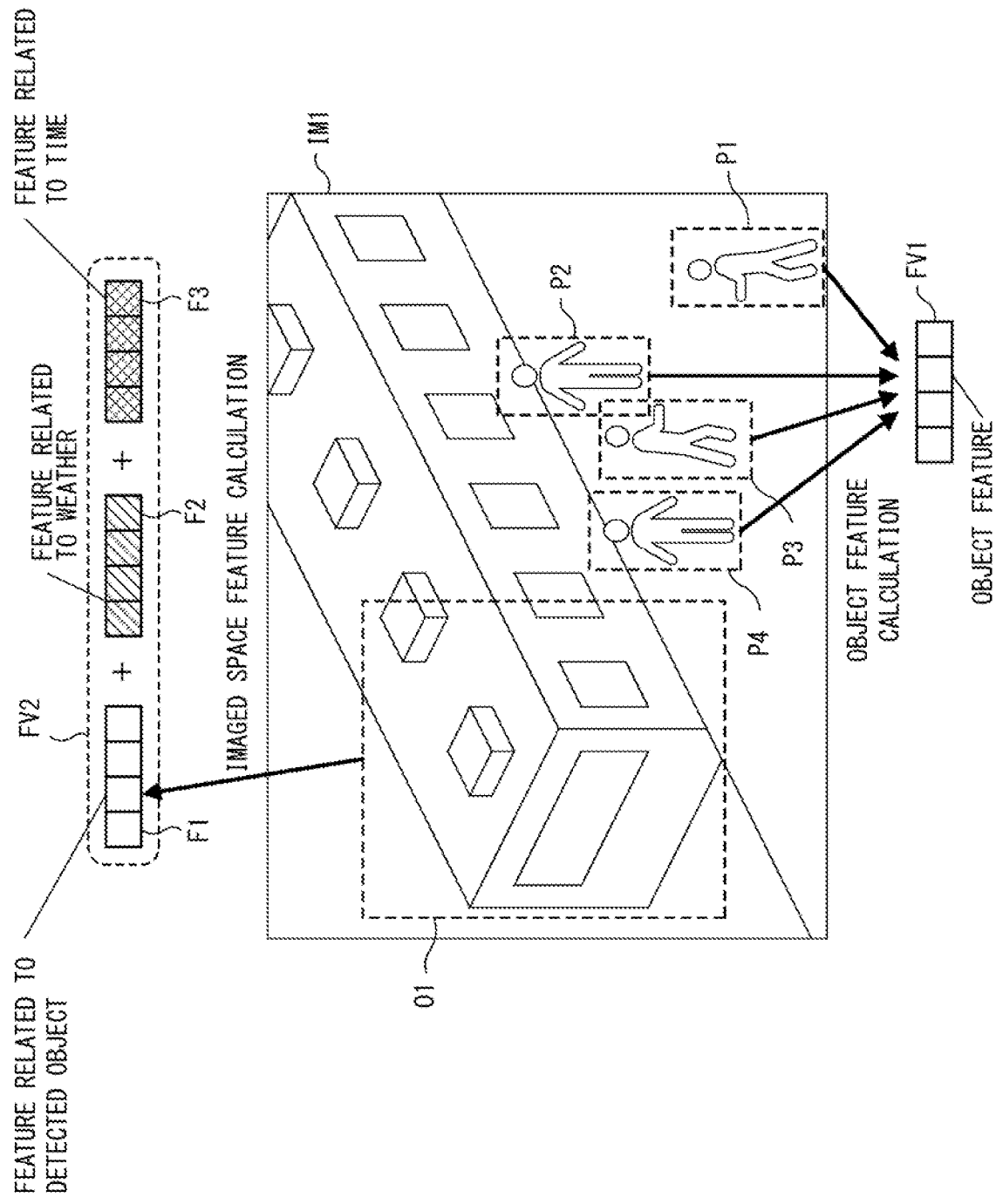
FIG. 3 is a view showing an example of a feature calculation method of an object feature calculation unit and an imaged space feature calculation unit according to the second example embodiment.

An example of a calculation method of an object feature in the object feature calculation unit 31A is described hereinafter with reference to FIG. 3. As shown in FIG. 3, the object feature calculation unit 31A calculates rectangular regions P1, P2, P3 and P4 that include a target object (which is a person in FIG. 3) of state determination from an image IM1, and calculates an object feature vector FV1 from those rectangular regions.

Examples of features calculated in the object feature vector FV1 include the number of persons (the number of target objects) corresponding to the number of detected rectangles, the position distribution in the image or real space, the moving speed distribution and the like. Note that features to be calculated and a method of calculating the features are not particularly limited as long as they can be output as a feature vector with a predetermined number of dimensions. For example, features related to other attributes (e.g., gender, age, clothes etc., when a target object is a person) of a target object may be added to features to be calculated, or only some of the above-described features may be calculated. Further, a method of calculating features may calculate features for each local region of an image and arrange features of all local regions as a feature vector, or may calculate features from an entire image and arrange them as a feature vector.

The imaged space feature calculation unit 31B calculates imaged space features from an "image" contained in the acquired past image data or target image data and the "imaging time" of this image. The imaged space feature calculation unit 31B then outputs the calculated imaged space features collectively as one feature vector.

An example of a method of calculating an imaged space feature in the imaged space feature calculation unit 31B is described hereinafter with reference to FIG. 3. As shown in FIG. 3, the imaged space feature calculation unit 31B calculates a rectangular region O1 (a region containing a train front face in FIG. 3) that includes an object other than a target object (which is a person in FIG. 3) of state determination from an image IM1, and calculates, for this rectangular region, an imaged space feature vector FV2 composed of a feature F1 related to a detected object, a feature F2 related to the weather, and a feature F3 related to the time. Each of the features F1 to F3 may include a plurality of features (elements).

Examples of features calculated in the feature F1 related to the detected object include aggregate results (e.g., train:1, vehicle:0, signal:0) of count of each type of object, the position distribution of each type of object in the image or real space, the moving speed distribution of each type of object and the like. Note that, however, the type of an object other than a target object of state determination is predetermined in accordance with the space to be imaged. Examples of features calculated in the feature F2 related to the weather include weather, precipitation, wind velocity and the like. Examples of features calculated in the feature F3 related to the time include a day of the week, season, time and the like. A method of calculating a feature related to the weather is not particularly limited, and for example, the installation location of the above-described camera may be registered in advance, and information on the web may be acquired from information of the "imaging time" of the image described above, or may be estimated from the acquired "image". Further, features to be calculated and a method of calculating the features are not limited as long as they can be collected as a feature vector with a predetermined number of dimensions. For example, features related to another attribute of the space being imaged (e.g., event information held nearby etc.) may be added to features to be calculated, or only some of the above-described features may be calculated. Further, a method of calculating features may calculate features for each local region of an image and arrange features of all local regions as a feature vector, or may calculate features from an entire image and arrange them as a feature vector.

On the basis of the object feature and the imaged space feature calculated as above, the reference state deciding unit 32 extracts the correlation between the two features, and decides, from this relation, a reference state for the object feature suitable for the target image data of state determination from the past image data.

For example, the reference state deciding unit 32 includes a correlation calculation unit 32A and a similarity calculation unit 32B as shown in FIG. 2.

The correlation calculation unit 32A is a projection matrix calculation unit that calculates a projection matrix in a latent feature space on the basis of the correlation between the object feature and the imaged space feature in the past image data. The calculated projection matrix is a projection matrix in a latent feature space that maximizes the correlation coefficient between the object feature and the imaged space feature.

Further, the correlation calculation unit 32A is also a latent feature calculation unit that calculates a latent feature that increases the correlation between the object feature and the imaged space feature by using the projection matrix in the latent feature space obtained from the past image data. When the correlation calculation unit 32A receives the object feature and the imaged space feature calculated from the past image data by the feature calculation unit 31, it calculates a projection matrix in a latent feature space that increases the correlation between the object feature and the imaged space feature and also calculates a latent feature using the projection matrix. On the other hand, when the correlation calculation unit 32A receives the object feature and the imaged space feature calculated from the target image data (data for which a reference state is to be determined) at the time of state determination by the feature calculation unit 31, it calculates a latent feature using the projection matrix for the object feature and the imaged space feature.

A calculation method of a projection matrix for calculating a latent feature using past image data and a calculation method of a latent feature using a projection matrix by the correlation calculation unit 32A are described hereinafter. To be specific, it is assumed first that an object feature and an imaged space feature calculated by inputting a plurality of "images" contained in the acquired past image data and the "imaging time" of those images to the object feature calculation unit 31A and the imaged space feature calculation unit 31B are $X_h=[x_{h1}, x_{h2}, \ldots, x_{hn}, \ldots, x_{hN}]$ and $X_a=[x_{a1}, x_{a2}, \ldots, x_{an}, \ldots, x_{aN}]$, respectively ($x_{hn}$ is an L-dimensional vector, $x_{an}$ is an M-dimensional vector, n is an integer from 1 to N, and N is the total number of data acquired in the past). Thus, $X_h$ is an L×N matrix, and $X_a$ is an M×N matrix. Consider now projection vectors $w_h$ and $w_a$ in a common latent feature space where the correlation coefficient $\rho$ between $X_h$ and $X_a$ (the following Expression (1)) is maximum ($w_h$ an L-dimensional vector, and $w_a$ is an M-dimensional vector).

[Expression 1]

$$\rho = \frac{w_h^T X_h H H X_a^T w_a}{\sqrt{w_h^T X_h H H X_h^T w_h} \sqrt{w_a^T X_a H H X_a^T w_a}} \quad (1)$$

In the above Expression (1), H is a centering matrix, which can be calculated by the following Expression (2).

[Expression 2]

$$H = I - \frac{1}{N} 11^T \quad (2)$$

Note that I in the above Expression (2) is an N×N identity matrix, and 1 in the Expression (2) is an N-dimensional vector where all elements are 1.

The projection vectors $w_h$ and $w_a$ in the common latent feature space where the correlation coefficient $\rho$ is maximum can be obtained by solving the maximization problem of Expression (1). Since there are an infinite number of solutions of Expression (1), and the value of the correlation coefficient $\rho$ does not change by constant multiple of $w_h$ and $w_a$, constraints $w_h^T X_h H H X_h^T w_h = 1$ and $w_a^T X_a H H X_a^T w_a = 1$ are added. Under the above constraints, the maximization problem of Expression (1) can be calculated as an extremal problem of the Lagrangian function by application of the Lagrange multiplier method (the following Expression (3)).

[Expression 3]

$$L(w_h, w_a) = \quad (3)$$
$$w_h^T X_h H H X_a^T w_a + \frac{\lambda_h}{2}(1 - w_h^T X_h H H X_h^T w_h) + \frac{\lambda_a}{2}(1 - w_a^T X_a H H X_a^T w_a)$$

Note that $\lambda_h$ and $\lambda_a$ in Expression (3) are Lagrange multipliers. By partially differentiating the above Expression (3) with respect to $w_h$ and $w_a$ and equating to 0, optimum values for $w_h$ and $w_a$ are finally obtained by solving the generalized eigenvalue problem represented by the following Expression (4).

[Expression 4]

$$\begin{bmatrix} 0 & X_h H H X_a^T \\ X_a H H X_h^T & 0 \end{bmatrix} \begin{bmatrix} w_h \\ w_a \end{bmatrix} = \lambda \begin{bmatrix} X_h H H X_h^T & 0 \\ 0 & X_a H H X_a^T \end{bmatrix} \begin{bmatrix} w_h \\ w_a \end{bmatrix} \quad (4)$$

Note that $\lambda$ in Expression (4) is $\lambda=\lambda_h=\lambda_a$. By solving the above Expression (4), $w_h$ and $w_a$ are calculated as a plurality of eigenvectors $w_h^d$ and $w_a^d$ (d=1, 2, ..., D; D is the number of dimensions of the latent feature space). The correlation calculation unit 32A collects the eigenvectors into a matrix and thereby obtains projection matrices $W_h=[w_h^1, w_h^2, \ldots, w_h^D]$ and $W_a=[w_a^1, w_a^2, \ldots, w_a^D]$ in the D-dimensional latent feature space that is common between the object feature and the imaged space feature. Further, when the correlation calculation unit 32A receives input of the past image data, it calculates a latent feature $V_h=[v_{h1}, v_{h2}, \ldots, v_{hN}]$ for the object feature and a latent feature $V_a=[v_{a1}, v_{a2}, \ldots, v_{aN}]$ for the imaged space feature with the projection matrices $w_h$ and $w_a$. Note that each of latent feature vectors $w_{hn}$ and $v_{an}$ can be calculated with $v_{hn}=W_h^T(x_{hn}-x_h')$ and $v_{an}=W_a^T(x_{an}-x_a')$, where $x_h'$ is a mean vector of the object feature $x_{h1}, x_{h2}, \ldots, x_{hN}$ of the past image data, and $x_a'$ is a mean vector of the imaged space feature $x_{a1}, x_{a2}, \ldots, x_{aN}$ of the past image data. Specifically, it calculates a latent feature where the object feature of the past image data is projected from the object feature and a mean vector of the past image data by using the projection matrix of the object feature, and calculates a latent feature where the imaged space feature of the past image data is projected from the imaged space feature and a mean vector of the past image data by using the projection matrix of the imaged space feature.

A method of calculating the projection matrices $w_h$ and $w_a$ is not limited to the above-described method. For example, the non linear correlation may be taken into consideration by using the kernel method, or the problem of minimizing the inverse of the correlation between two features may be solved using a neural network, and the weight of this network may be used as the projection matrix. Further, although various states such as normal time and abnormal time, for example, may be contained in the past image data, more suitable calculation of the correlation is achieved by narrowing down to data of one state (e.g., normal time).

Further, a method of calculating a latent feature by using the projection matrix from target image data (data for which a reference state is to be determined) at the time of state determination is described hereinafter. To be specific, when the correlation calculation unit 32A receives an object feature $x_h$ and an imaged space feature $x_a$ calculated by the feature calculation unit 31 from the "image" and the "imaging time" contained in the acquired target image data, it outputs latent feature vectors $v_h=W_h^T(x_h-x_h')$ and $v_a=W_a^T(x_a-x_a')$ with the projection matrices $W_h$ and $W_a$. Specifically, it calculates a latent feature where the object feature of the past image data is projected from the object feature and a mean vector of the past image data by using the projection matrix of the object feature, and calculates a latent feature where the imaged space feature of the target image data is projected from the imaged space feature and a mean vector of the target image data by using the projection matrix of the imaged space feature.

The similarity calculation unit 32B is a calculation unit that calculates the similarity between a latent feature in past image data and a latent feature in target image data and also a deciding unit that decides a feature of a reference state on the basis of the calculated similarity. The similarity calculation unit 32B calculates the similarity between the latent feature (a cluster in the latent feature space) of the object feature and the imaged space feature in the past image data and the latent feature of the imaged space feature in the target image data.

Specifically, the similarity calculation unit 32B decides a feature related to a reference state of the target object to be used for state determination on the basis of the similarity to a cluster center in the latent feature space calculated from the latent feature in the past image data by using the latent feature output from the correlation calculation unit 32A. To be specific, when the similarity calculation unit 32B receives the latent feature calculated from the past image data, it calculates a cluster center in the latent feature space. On the other hand, when the similarity calculation unit 32B receives the latent feature calculated from the target image data of state determination, it calculates the similarity to the cluster center and thereby decides a feature related to a reference state of the target object to be used for state determination.

Figure 4:
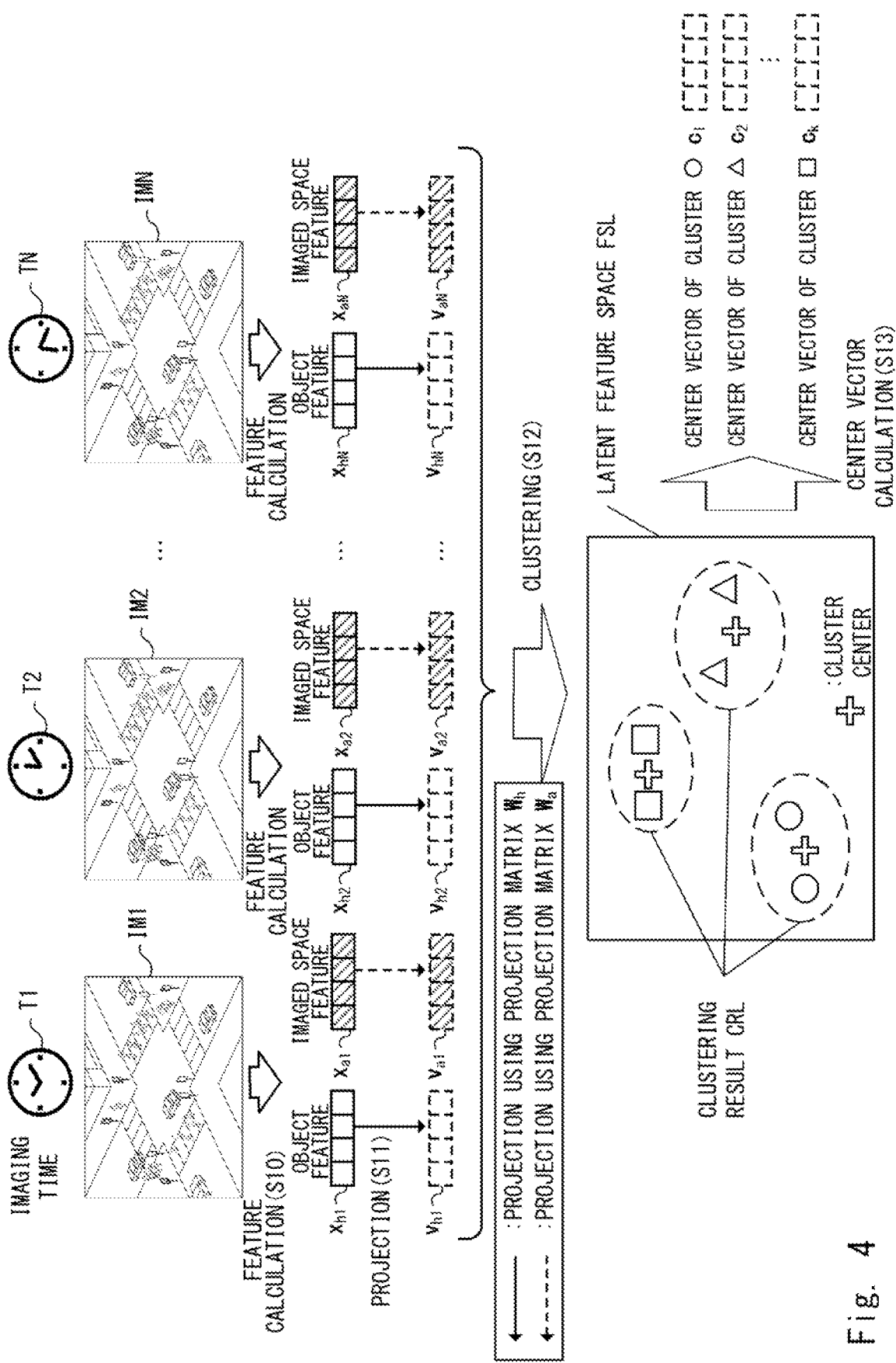
FIG. 4 is a view showing an example of a calculation method of a cluster center vector of a similarity calculation unit according to the second example embodiment.

A method of calculating a cluster center vector in a latent feature space from a latent feature of past image data by the similarity calculation unit 32B is described hereinafter. FIG. 4 shows an example of a calculation method of a cluster center in a latent space from a latent feature output from the correlation calculation unit 32A. To be specific, the object feature calculation unit 31A and the imaged space feature calculation unit 31B first calculate object feature vectors $x_{h1}, x_{h2}, \ldots, x_{hi}, \ldots, x_{hN}$ and imaged space feature vectors $x_{a1}, x_{a2}, \ldots, x_{ai}, \ldots, x_{aN}$ ($x_{hi}$ is an L-dimensional vector, $x_{ai}$ is an M-dimensional vector, i is an integer from 1 to N, and N is the total number of data acquired in the past) from a plurality of images IM1, IM2, ..., IMN contained in the acquired past image data and the imaging time T1, T2, ..., TN of those images (S10). Further, the correlation calculation unit 32A calculates latent feature vectors $v_{h1}, v_{h2}, \ldots, v_{hi}, \ldots, v_{hN}$ of the object feature and latent feature vectors $v_{a1}, v_{a2}, \ldots, v_{ai}, \ldots, v_{aN}$ of the imaged space feature by using projection matrices $W_h$ and $W_a$ in the calculated latent space (S11). At this time, the similarity calculation unit 32B applies a clustering method such as the k-means method in a latent feature space FSL composed of 2N number of latent feature vectors of the object feature and the imaged space feature, and thereby obtains a clustering result CRL (S12). Further, the similarity calculation unit 32B calculates k number of cluster center vectors $c_1, c_2, \ldots, c_k$ on the basis of this clustering result CRL (S13).

On the other hand, when the similarity calculation unit 32B receives input of the latent feature calculated by the correlation calculation unit 32A from the target image data at the time of state determination, it accepts as input only a latent feature vector $v_a$ for the imaged space feature. At this time, the similarity calculation unit 32B obtains a cluster center vector that is most similar to the latent feature vector $v_a$ from the k number of cluster center vectors, and decides this vector as a feature of the reference state of the target object to be used for state determination.

The storage device 40 stores projection matrices in a latent feature space to be used by the reference state deciding unit 32, mean vectors $x_h'$ and $x_a'$ of the object feature and the imaged space feature calculated from the past image data, and cluster information made up of cluster center vectors in the latent feature space. The reference state deciding unit 32 reads the information stored in the storage device 40 and calculates the latent feature and also calculates the most similar cluster center. Although the storage device 40 is a separate device from the reference state deciding device 30 in FIG. 2, it is not limited thereto. For example, the reference state deciding device 30 may include the storage device 40.

The state determination device 50 determines whether it is a different state from the reference state or the same state as the reference state on the basis of a difference between the latent feature vector $v_h$ of the object feature calculated by the correlation calculation unit 32A and the feature of the reference state output from the similarity calculation unit 32B. For example, when the past image data in a normal state is accumulated, the reference state calculated by the similarity calculation unit 32B can be regarded as a feature of the reference for normal. Thus, when a difference between the latent feature vector $v_h$ and the feature of the reference state is a certain value or more, it can be determined as an abnormal state. On the other hand, when the past image data in an abnormal state is accumulated, a determination result is opposite to the above one.

Note that a determination method in the state determination device 50 is not particularly limited as long as it is a method of using the feature of the reference state output from the reference state deciding unit 32 and the latent feature vector $v_h$ related to an object for which state determination is to be made calculated by the correlation calculation unit 32A. For example, a difference between the feature of the reference state in the latent feature space and the latent feature vector $v_h$ may be directly compared with each other, or if an inverse projection matrix in the original feature space from the latent feature space can be calculated, a difference may be compared in the feature spaces by inversely projecting the feature of the reference state in the latent feature space and the latent feature vector $v_h$ on the feature in the original object feature space. Further, although the state determination device 50 is a separate device from the reference state deciding device 30 in FIG. 2, it is not limited thereto. For example, the reference state deciding device 30 may include the state determination device 50.

<Operation Example of Reference State Deciding Device>

Figure 5:
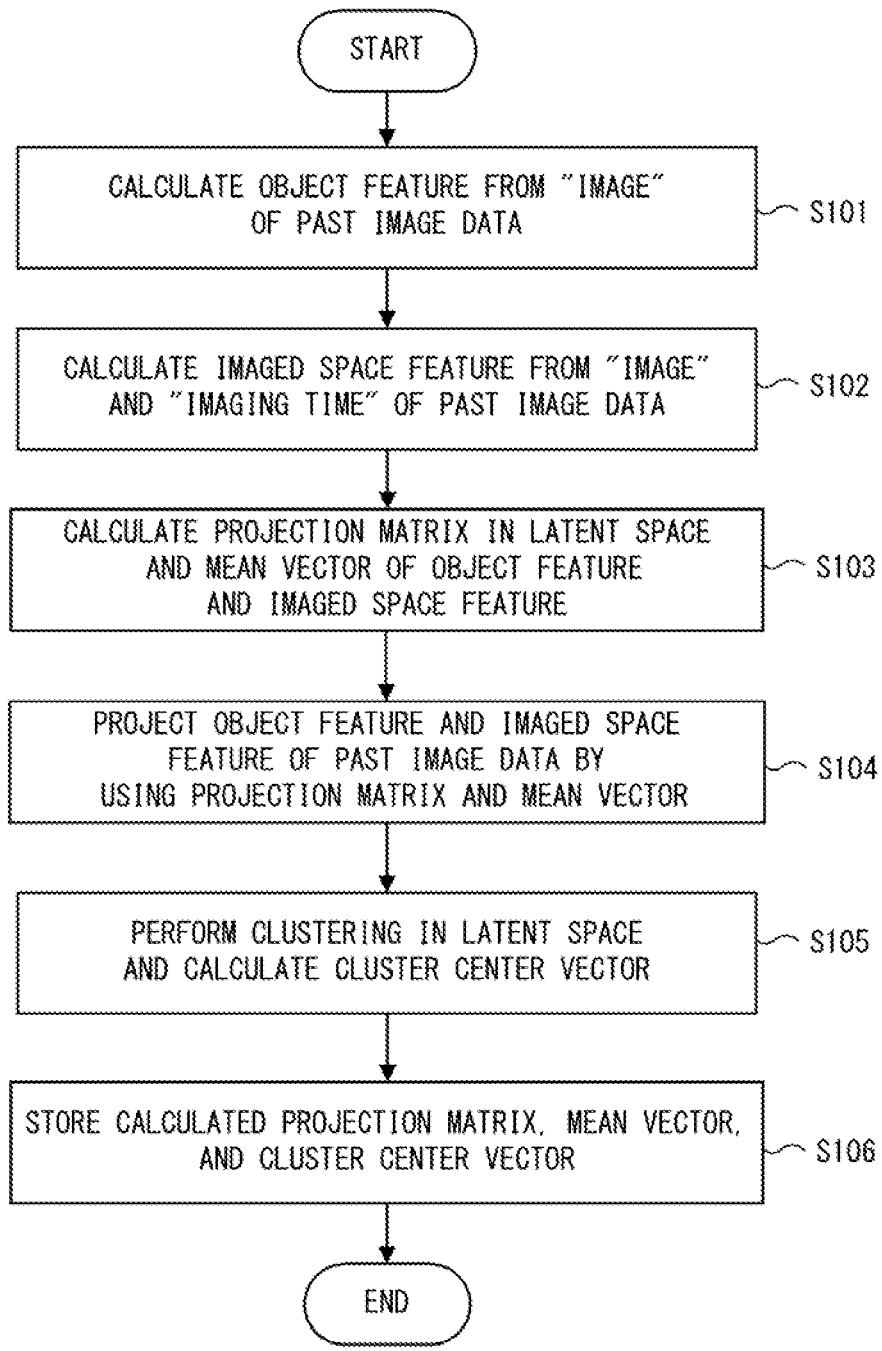
FIG. 5 is a flowchart showing an example of an operation on past image data of the reference state deciding device according to the second example embodiment.

An example of the operation of the above-described reference state deciding device 30 is described hereinafter. FIG. 5 is a flowchart showing an example of the operation of the reference state deciding device on the past image data in the second example embodiment.

First, the object feature calculation unit 31A calculates object features related to an object such as the number of target objects for state determination, the position of this object and the moving speed of this object from the "image" contained in the acquired past image data. Then, the object feature calculation unit 31A outputs the calculated object features collectively as one feature vector (Step S101).

Next, the imaged space feature calculation unit 31B calculates imaged space features related to the space being imaged, such as an object other than a target object of state determination, the number of objects, the position of the object, the moving speed of the object, a feature related to the weather, and a feature related to the imaging time of the image, from the "image" contained in the acquired past image data and the "imaging time" of the image. Then, the imaged space feature calculation unit 31B outputs the calculated imaged space features collectively as one feature vector (Step S102).

Then, the correlation calculation unit 32A receives input of a certain number (e.g., 100) or more pairs of the object feature and the imaged space feature in the past image data in Steps S101 and S102, and calculates a projection matrix in a latent space that increases the correlation between the features and a mean vector of the object feature and the imaged space feature (Step S103).

The correlation calculation unit 32A then projects the object feature and the imaged space feature in the past image data in a latent space by using the projection matrix in the latent space and the mean vector calculated in Step S103 (Step S104).

After that, the similarity calculation unit 32B performs clustering of feature vectors in the latent space calculated in Step S104 and thereby calculates a cluster center vector (Step S105).

Then, the storage device 40 stores the projection matrix and the mean vector of the object feature and the imaged space feature calculated in Step S103, and the cluster center vector calculated in Step S105 (Step S106).

Figure 6:
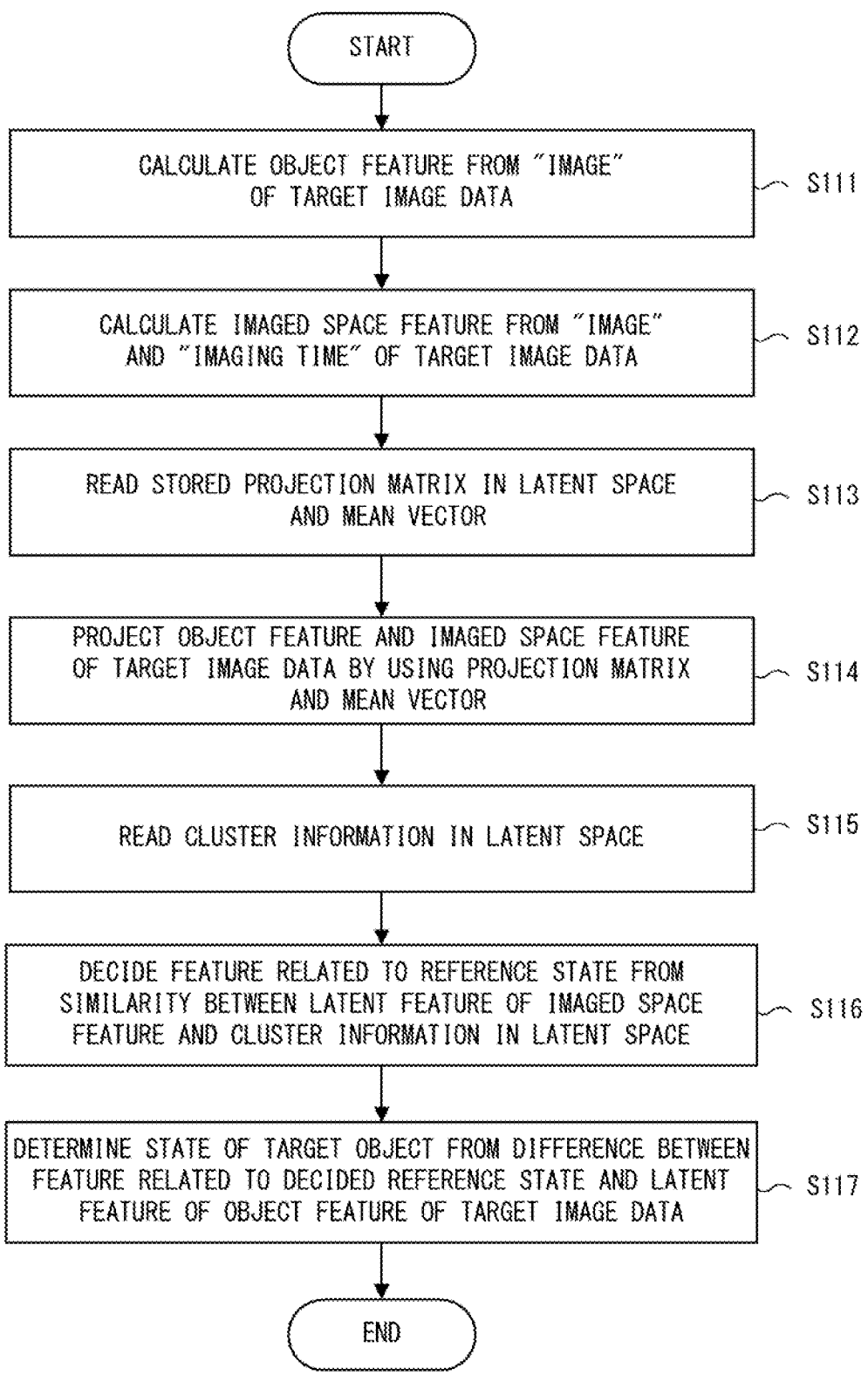
FIG. 6 is a flowchart showing an example of an operation on target image data at the time of state determination of the reference state deciding device according to the second example embodiment.

FIG. 6 is a flowchart showing an example of the operation of the state deciding device on target image data at the time of state determination according to the second example embodiment. The processing of FIG. 6 is performed at least after the processing of FIG. 5.

First, the object feature calculation unit 31A calculates object features related to an object, such as the number of target objects for state determination, the position of the object and the moving speed of the object, from the "image" contained in the acquired target image data. Then, the object feature calculation unit 31A outputs the calculated object features collectively as one feature vector (Step S111).

Next, the imaged space feature calculation unit 31B calculates imaged space features related to the space being imaged, such as objects other than a target object of state determination, the number of the objects, the position of the object, the moving speed of the object, a feature related to the weather, and a feature related to the imaging time of the image, from the "image" contained in the acquired target image data and the "imaging time" of this image. Then, the imaged space feature calculation unit 31B outputs the calculated imaged space features collectively as one feature vector (Step S112).

Then, the correlation calculation unit 32A reads the projection matrix in the common latent feature space that increases the correlation between the object feature and the imaged space feature, the mean vector of the object feature calculated from the past image data, and the mean vector of imaged space feature stored in the storage device 40 (Step S113).

The correlation calculation unit 32A then projects the object feature and the imaged space feature in the target image data in Step S111 and Step S112 in the latent space by using the projection matrix and the mean vector read in Step S113. The correlation calculation unit 32A calculates the latent feature that increases the correlation between the object feature output from the object feature calculation unit 31A and the feature output from the imaged space feature calculation unit 31B by using the projection matrix in the latent feature space read from the storage device 40 (Step S114).

After that, the similarity calculation unit 32B reads cluster information made up of cluster center vectors in the latent feature space stored in the storage device 40 (Step S115).

Then, the similarity calculation unit 32B decides a feature related to the reference state of the target object to be used for state determination on the basis of the similarity between the latent feature of the imaged space feature output from the correlation calculation unit 32A in Step S114 and the cluster center vector in the latent feature space read from the storage device 40 in Step S115 (Step S116).

Finally, the state determination device 50 determines whether it is a state different from the reference state or the same state as the reference state on the basis of a difference between the feature of the reference state output from the similarity calculation unit 32B in Step S116 and the latent feature vector of the object feature in the target image data calculated by the correlation calculation unit 32A in Step S114 (Step S117). The determined state is output to an output device (a display device, for example), which is not shown.

As described above, according to the second example embodiment, the reference state deciding device 30 calculates a feature in the latent feature space that increases the correlation between the object feature and the imaged space feature of the target image data, and decides a feature of the reference state in the latent feature space from the similarity to the cluster center vector in the latent feature space on the basis of the calculated latent feature vector of the imaged space feature. The state determination device 50 determines whether the target object is in a different state from or in the same state as the reference state by using the feature of the reference state in the latent feature space calculated by the reference state deciding device 30 and the object feature projected in the latent feature space.

In the above-described configuration, the reference state deciding device 30 allows deciding a reference state suitable for the situation of a space being imaged in consideration of the correlation between a feature of a target object of state determination and a feature of the space being imaged, which improves the accuracy of state determination of the object shown in the image.

Third Example Embodiment

In a third example embodiment, an example of using the co-occurrence between the object feature and the imaged space feature as the relation between the object feature and the imaged space feature to be taken into consideration when deciding the reference state in the first example embodiment is described.

<Configuration Example of Reference State Deciding System>

Figure 7:
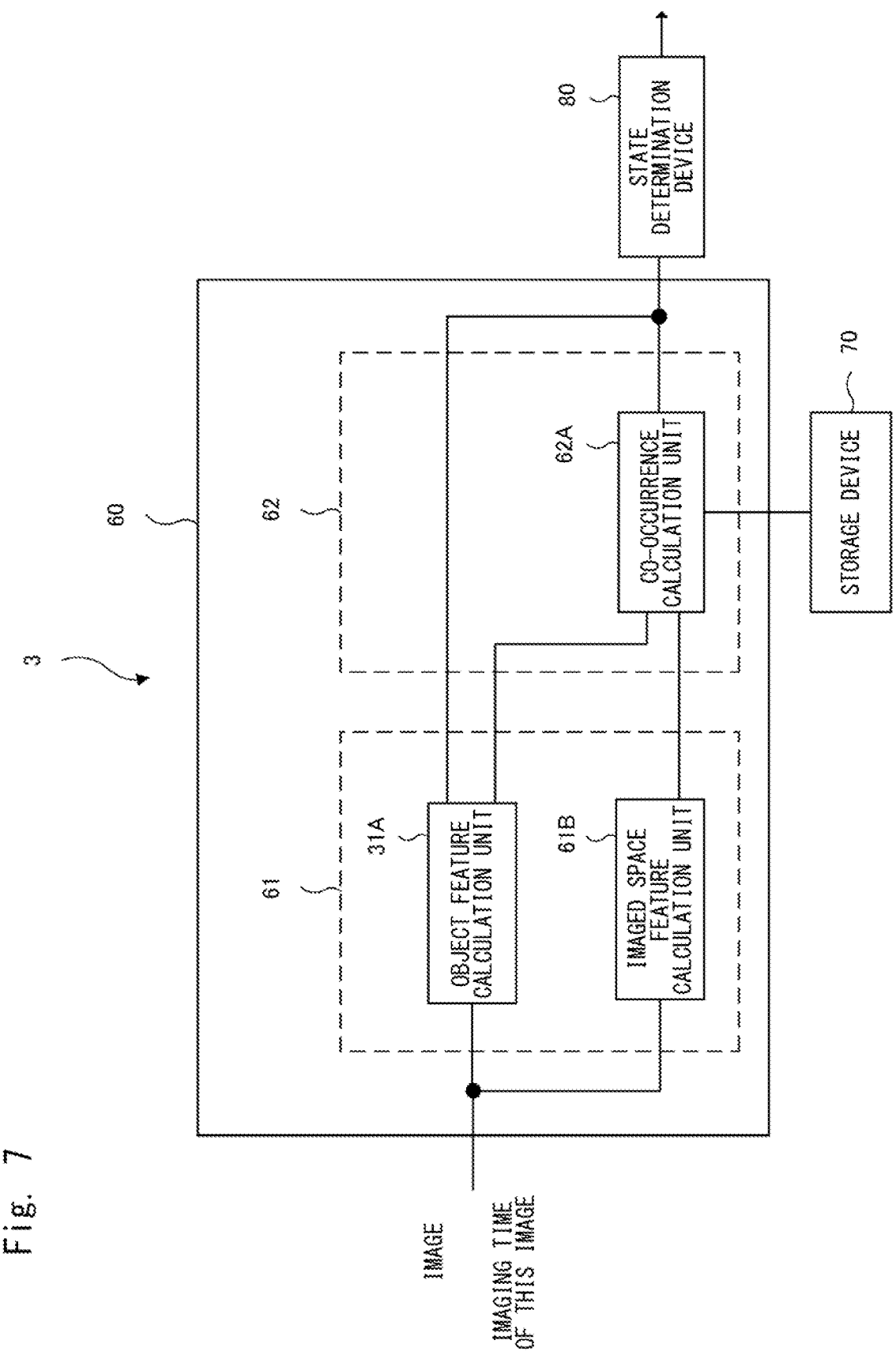
FIG. 7 is a block diagram showing an example of a reference state deciding system including a reference state deciding device according to a third example embodiment.

FIG. 7 is a block diagram showing an example of a reference state deciding system (state determination system) including a reference state deciding device according to the third example embodiment. In FIG. 7, a reference state deciding system 3 includes a reference state deciding device 60, a storage device 70, and a state determination device 80.

The reference state deciding device 60 includes a feature calculation unit 61 and a reference state deciding unit 62. The feature calculation unit 61 calculates an object feature and an imaged space feature from image data containing an acquired "image" and "imaging time" of the image, just like the feature calculation unit 31 in the second example embodiment.

For example, as shown in FIG. 7, the feature calculation unit 61 includes an object feature calculation unit 31A and an imaged space feature calculation unit 61B. The object feature calculation unit 31A is the same as that in the second example embodiment.

The imaged space feature calculation unit 61B extracts rectangular regions of objects other than a state determination target object from an "image" contained in the acquired past image data or target image data and the "imaging time" of the image, and calculates an imaged space feature for each of the extracted rectangular regions. It further collects imaging features calculated for the respective rectangular regions as one feature vector. Thus, the imaged space feature calculation unit 61B calculates one feature vector for each extracted rectangular region of an object rather than calculating one feature vector for acquired image data, which is different from the imaged space feature calculation unit 31B in the second example embodiment. Note that, however, a feature calculated by the imaged space feature calculation unit 61B is the same as that calculated by the imaged space feature calculation unit 31B in the second example embodiment. The imaged space feature calculation unit 61B finally outputs a plurality of feature vectors calculated for the respective rectangular regions.

Figure 8:
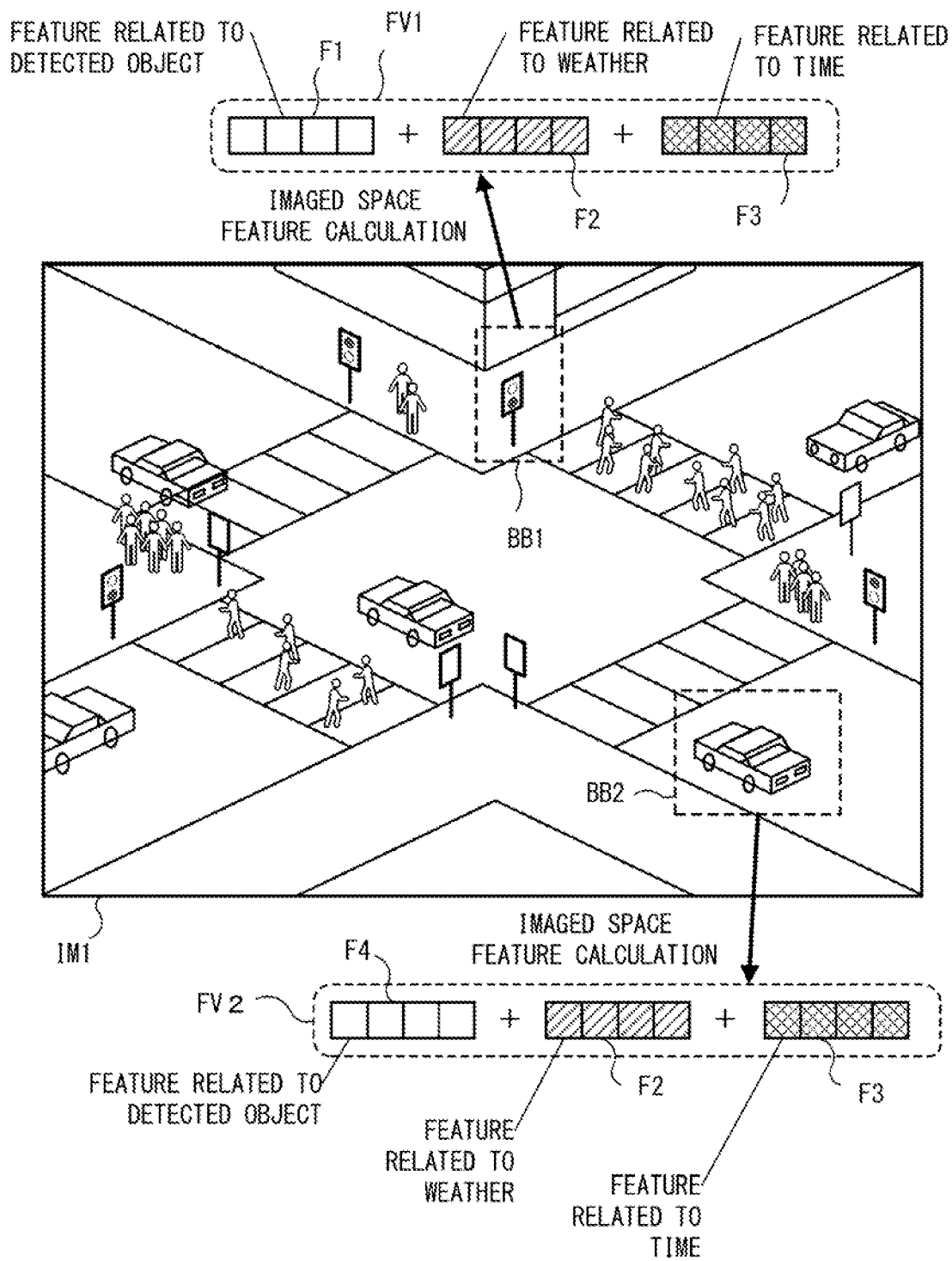
FIG. 8 is a view showing an example of a feature calculation method of an imaged space feature calculation unit according to the third example embodiment.

FIG. 8 is a view showing an example of a calculation method of an imaged space feature in the imaged space feature calculation unit 61B. As shown in FIG. 8, the imaged space feature calculation unit 61B calculates a rectangular region BB1 (which is a region containing a traffic light in FIG. 8) that includes an object other than a target object (which is a person in FIG. 8) of state determination from an image IM1, and calculates, for this rectangular region, an imaged space feature vector FV1 composed of a feature F1 related to a detected object, a feature F2 related to the weather, and a feature F3 related to the time. On the other hand, for a different rectangular region BB2 (which is a region containing an automobile in FIG. 8), the imaged space feature calculation unit 61B calculates an imaged space feature vector FV2 composed of a feature F4 related to a detected object, a feature F2 related to the weather, and a feature F3 related to the time. For example, the feature F1 related to a detected object in the imaged space feature vector FV1 includes a class of the traffic light, the image feature, the moving speed and the like, and the feature F4 related to a detected object in the imaged space feature vector FV2 includes a class of the vehicle, the image feature, the moving speed and the like. Further, in the imaged space feature vectors FV1 and FV2, the feature F2 related to the weather includes weather, precipitation, wind velocity and the like, and the feature F3 related to the time includes a day of the week, season, time and the like. Thus, the feature related to the weather and the feature related to the time are common between the imaged space feature vectors FV1 and FV2. Further, features to be calculated and a method of calculating the features are not limited as long as they can be collected as a feature vector with a predetermined number of dimensions for each rectangular region.

On the basis of the object feature and the imaged space feature calculated as above, the reference state deciding unit 62 extracts the co-occurrence between the two features, and decides, from the past image data, a reference state for the object feature suitable for the target image data to be used for state determination on the basis of the value of the co-occurrence.

For example, the reference state deciding unit 62 includes a co-occurrence calculation unit 62A as shown in FIG. 7.

The co-occurrence calculation unit 62A is a calculation unit that calculates the probability of co-occurrence between the object feature and the imaged space feature in the past image data and also a deciding unit that decides a feature of a reference state from the object feature corresponding to the imaged space feature in the target image data based on the probability of co-occurrence. The co-occurrence calculation unit 62A calculates the object feature with a high probability of co-occurrence with the input imaged space feature from the object feature and the imaged space feature in the past image data, and decides a reference state for the object feature that is suitable for the target image data to be used for state determination.

For example, the co-occurrence calculation unit 62A calculates the probability of co-occurrence between a cluster of the object feature and a cluster of the imaged space feature in the past image data, and decides a feature of the reference state on the basis of the cluster to which the object feature belongs that is selected on the basis of the probability of co-occurrence from the cluster to which the imaged space feature belongs in the target image data. At this time, the co-occurrence calculation unit 62A selects the cluster to which the object feature belongs with the highest probability of co-occurrence with the cluster to which the imaged space feature belongs, and decides a feature that is the cluster center of the cluster to which the object feature belongs as a feature of the reference state.

Figure 9A:
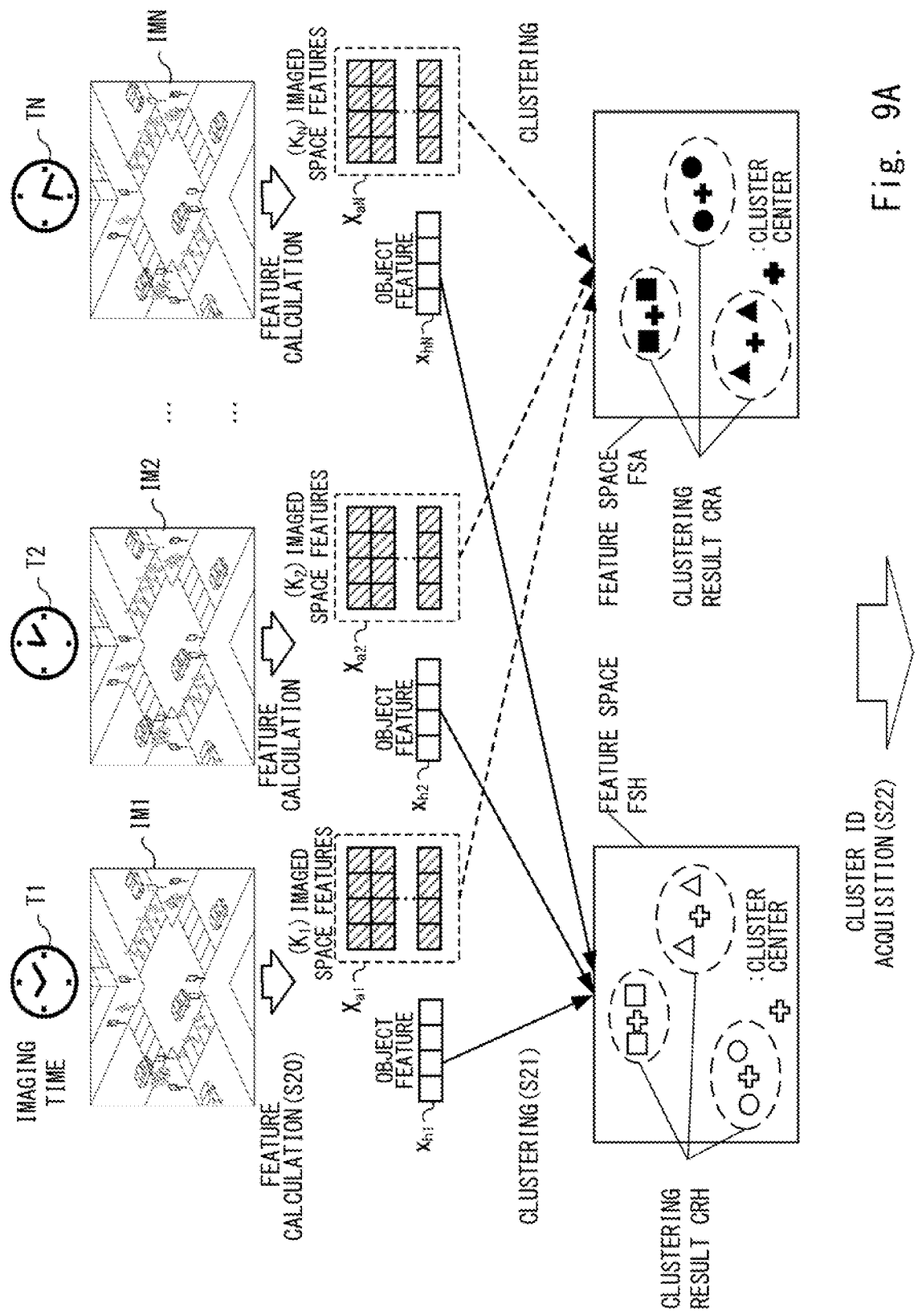
FIG. 9A shows an example of a calculation method of the co-occurrence probability between two features of a co-occurrence relation calculation unit according to the third example embodiment.
Figure 9B:
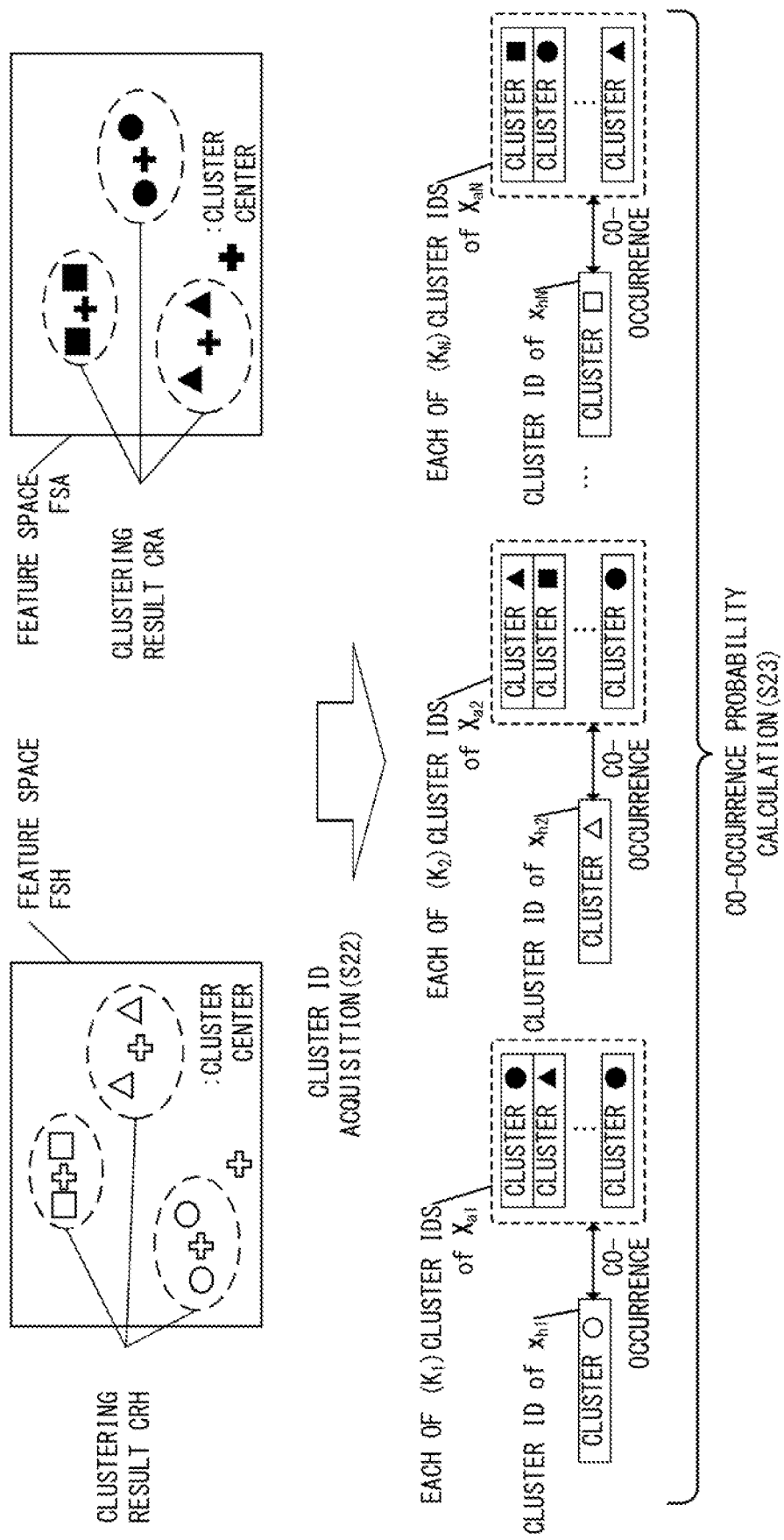
FIG. 9B shows an example of a calculation method of the co-occurrence probability between two features of a co-occurrence relation calculation unit according to the third example embodiment.

A calculation method of the co-occurrence between the object feature and the imaged space feature in the past image data by the co-occurrence calculation unit 62A is described hereinafter. FIGS. 9A and 9B show an example of a calculation method of the co-occurrence between the object feature output from the object feature calculation unit 31A and the imaged space feature output from the imaged space feature calculation unit 61B. To be specific, the object feature calculation unit 31A and the imaged space feature calculation unit 61B first calculate object feature vectors $x_{h1}$, $x_{h2}$, ..., $x_{hi}$, ..., $x_{hN}$ and matrices $X_{a1}$, $X_{a2}$, ..., $X_{ai}$, ..., $X_{aN}$ of imaged space feature vectors ($x_{hi}$ is an L-dimensional vector, $x_{ai}$ is a matrix of M-dimensional vectors corresponding to the total number $K_i$ of rectangles containing the objects extracted in the imaged space feature calculation unit 61B, i is an integer from 1 to N, and N is the total number of data acquired in the past) from a plurality of images IM1, IM2, ..., IMN contained in the acquired past image data and the imaging time T1, T2, ..., TN of those images (S20). At this time, the co-occurrence calculation unit 62A applies a clustering method such as the k-means method in a feature space FSH of the object feature composed of N number of latent feature vectors $x_{h1}$, $x_{h2}$, ..., $x_{hN}$ and a feature space FSA of the imaged space feature composed of all imaged space feature vectors ($K_1$+$K_2$+, ..., $K_N$ vectors) contained in the matrices $X_{a1}$, $X_{a2}$, ..., $X_{aN}$ and thereby obtains a clustering result CRH of the object feature and a clustering result CRA of the imaged space feature (S21). Further, the co-occurrence calculation unit 62A obtains cluster IDs corresponding to the object feature vectors $x_{h1}$, $x_{h2}$, ..., $x_{hN}$ and cluster IDs corresponding to the imaged space feature vectors contained in the matrices $X_{a1}$, $X_{a2}$, ..., $X_{aN}$ on the basis of the clustering result CRH and the clustering result CRA (S22). At this time, the co-occurrence calculation unit 62A assumes that a pair of matrices (e.g., $x_{h1}$ and $X_{a1}$) including the object feature and the imaged space feature vector calculated from the same image have co-occurrence relation, and calculates the probability of co-occurrence of the cluster ID from all pairs (S23).

Note that a calculation method of the probability of co-occurrence is not particularly limited. For example, the probability of occurrence of each cluster ID or the joint probability of a combination of cluster IDs may be calculated from the total number of combinations of cluster IDs, and the probability of co-occurrence may be decided on the basis of this result.

To be specific, the probability of co-occurrence may be calculated as follows. First, it is assumed that, in the clustering method applied in the co-occurrence calculation unit 62A, a cluster $C_{hq}$ of q number of object features (q is an integer from 1 to Q) and a cluster $C_{ar}$ of R number of imaged space features (r is an integer from 1 to R) are calculated in the feature space FSH and the feature space FSA in FIGS. 9A and 9B.

Consider now the probability of occurrence $P(C_{hq})$ of the cluster $C_{hq}$, the probability of occurrence $P(C_{ar})$ of the cluster $C_{ar}$, and the probability of co-occurrence $CP(C_{hq}, C_{ar})$ (the following Expression (5)) between the cluster $C_{hq}$ and the cluster $C_{ar}$ calculated from the joint probability $P(C_{hq}, C_{ar})$ of the cluster $C_{hq}$ and the cluster $C_{ar}$. For example, the co-occurrence calculation unit 62A calculates the probability of co-occurrence by this Expression (5).

[Expression 5]

$$CP(C_{hq}C_{ar}) = \log_2 \frac{P(C_{hq}, C_{ar})}{P(C_{hq})P(C_{ar})} \qquad (5)$$

A calculation method of the probability of co-occurrence is not limited to the above method. For example, only the joint probability $P(C_{hq}, C_{ar})$ of the cluster $C_{hq}$ and the cluster $C_{ar}$ may be used. Further, although various states such as normal time and abnormal time, for example, may be contained in the accumulated past image data, more suitable calculation of the co-occurrence is achieved by narrowing down to data of one state (e.g., normal time).

When the co-occurrence calculation unit 62A receives the object feature $x_h$ calculated by the object feature calculation unit 31A and the imaged space feature $X_a$ calculated by the imaged space feature calculation unit 61B from the target image data at the time of state determination, it extracts a cluster to which each feature vector in the imaged space feature $X_a$ belongs on the basis of the clustering result calculated from the past image data. Further, it calculates the cluster $C_{hq}$ of the object feature with a high probability of co-occurrence with the cluster to which each feature vector in the imaged space feature $X_a$ belongs on the basis of the probability of co-occurrence calculated from the past image data, and decides the cluster center vector of the cluster $C_{hq}$ as a reference state. Note that a method of calculating the cluster $C_{hq}$ with a high probability of co-occurrence with the cluster to which each feature vector in $X_a$ belongs is not particularly limited. For example, it may be calculated as a cluster with the highest probability of co-occurrence with the cluster to which each feature vector in $X_a$ belongs, or may be calculated as a cluster with the highest average of the probability of co-occurrence with the cluster to which each feature vector in $X_a$ belongs.

The storage device 70 stores cluster center vectors and each cluster ID in the object feature space and the imaged feature space calculated from the past image data used by the reference state deciding unit 62, and the probability of co-occurrence between a cluster ID in the object feature space and a cluster ID in the imaged feature space. The reference state deciding unit 62 reads the information stored in the storage device 70 and calculates the cluster center with the highest probability of co-occurrence. Although the storage device 70 is a separate device from the reference state deciding device 60 in FIG. 7, it is not limited thereto. For example, the reference state deciding device 60 may include the storage device 70.

The state determination device 80 determines whether it is a different state from the reference state or the same state as the reference state on the basis of a difference between the feature of the reference state output from the co-occurrence calculation unit 62A and the feature $x_h$ output from the object feature calculation unit 31A. Note that a determination method in the state determination device 80 is not particularly limited as long as it is a method using the feature of the reference state output from the co-occurrence calculation unit 62A and the feature $x_h$ output from the object feature calculation unit 31A. For example, a difference between the feature of the reference state and the feature vector $x_h$ may be directly compared. Further, although the state determination device 80 is a separate device from the reference state deciding device 60 in FIG. 7, it is not limited thereto. For example, the reference state deciding device 60 may include the state determination device 80.

<Operation Example of Reference State Deciding Device>

Figure 10:
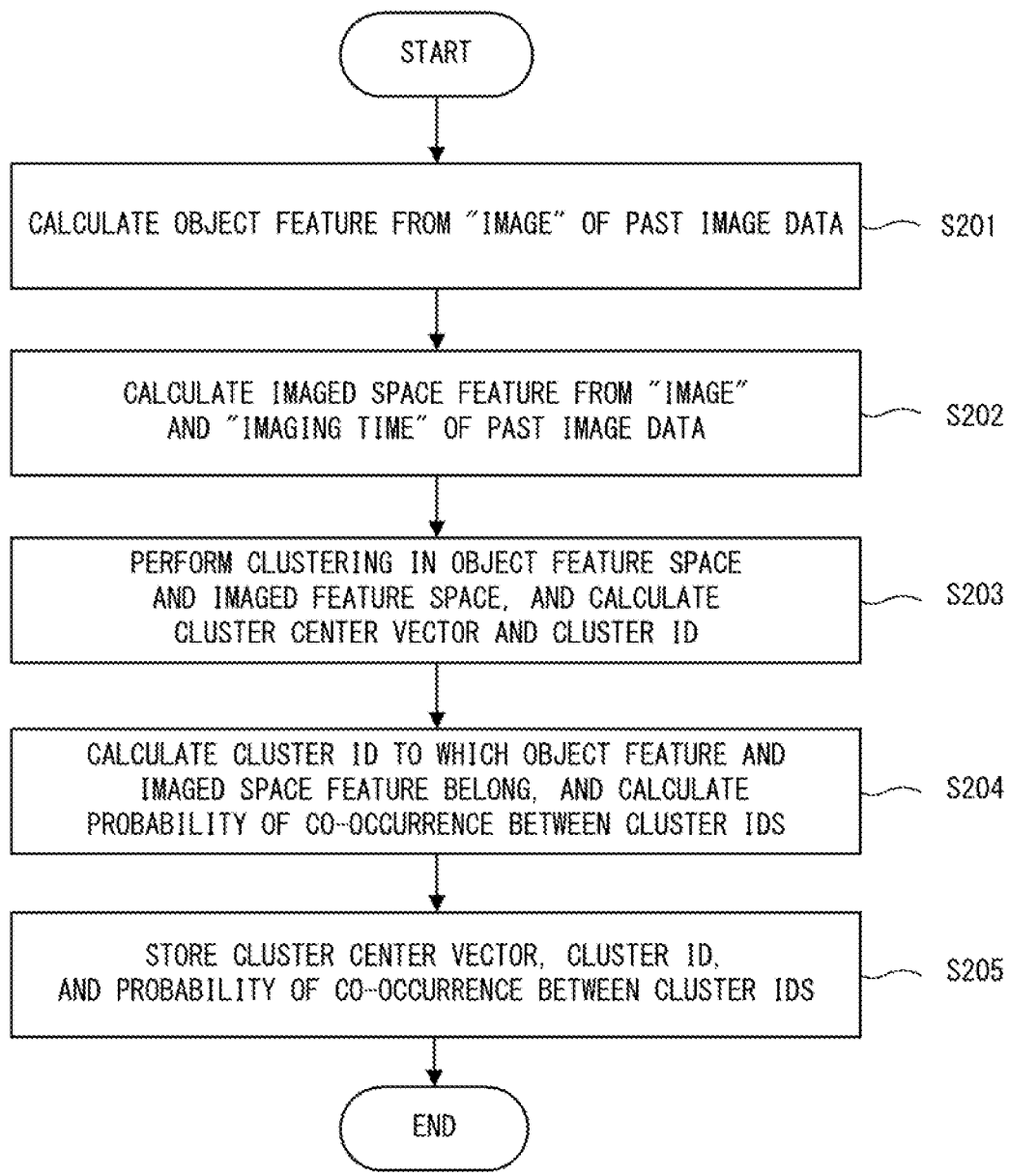
FIG. 10 is a flowchart showing an example of an operation on past image data of the reference state deciding device according to the third example embodiment.

An example of the operation of the above-described reference state deciding device 60 is described hereinafter. FIG. 10 is a flowchart showing an example of the operation of the reference state deciding device on the past image data in the third example embodiment.

First, the object feature calculation unit 31A calculates object features related to a target object, such as the number of target objects for state determination, the position of the object and the moving speed of the object, from the "image" contained in the acquired past image data. Then, the object feature calculation unit 31A outputs the calculated object features collectively as one feature vector (Step S201).

Next, the imaged space feature calculation unit 61B extracts rectangular regions of objects other than a target object of state determination from the "image" contained in the acquired past image data and the "imaging time" of the image, and calculates imaged space features related to the space being imaged, such as an object other than a target object of state determination, the position of the object, the moving speed of the object, a feature related to the weather, and a feature related to the imaging time, for each of the extracted rectangular regions. Then, the imaged space feature calculation unit 61B collects the features calculated for each rectangular region as one feature vector (Step S202).

Then, the co-occurrence calculation unit 62A receives input of a certain number or more pairs (e.g., 100 pairs) of the object feature and the imaged space feature in Steps S201 and S202, performs clustering of the feature vector in each feature space, and calculates the cluster center vector and each cluster ID (Step S203).

Then, the co-occurrence calculation unit 62A calculates cluster IDs to which each object feature vector and each imaged space feature vector belong by using the clustering result in Step S203, and calculates the probability of co-occurrence between the cluster ID to which the object feature belongs and the cluster ID to which the imaged space feature belongs (Step S204).

After that, the storage device 70 stores the cluster center vectors and each cluster ID calculated in Step S203, and the probability of co-occurrence between the cluster IDs calculated in Step S204 (Step S205).

Figure 11:
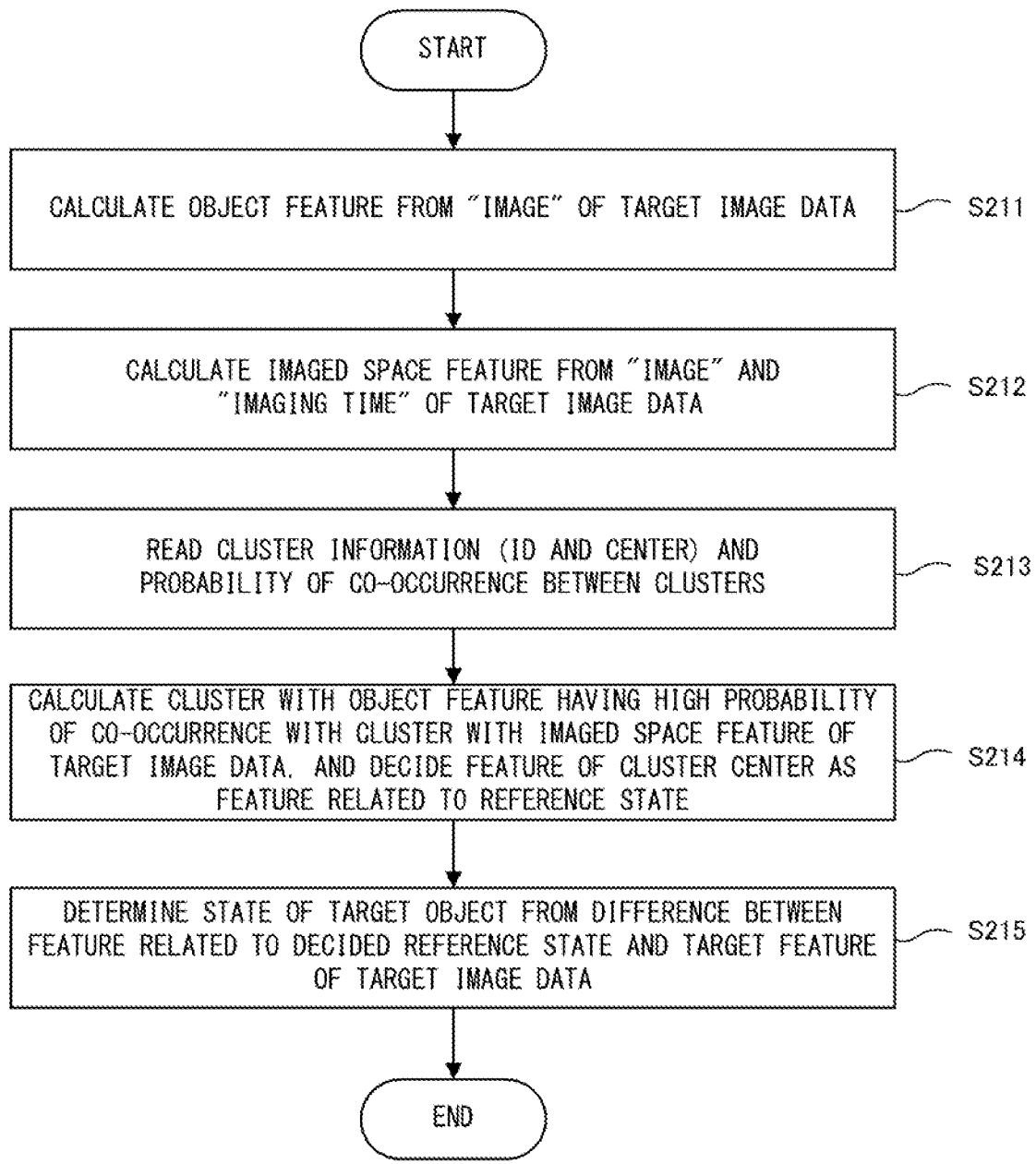
FIG. 11 is a flowchart showing an example of an operation on target image data at the time of state determination of the reference state deciding device according to the third example embodiment.

FIG. 11 is a flowchart showing an example of the operation of the reference state deciding device on target image data at the time of state determination according to the third example embodiment. The processing of FIG. 11 is performed at least after the processing of FIG. 10.

First, the object feature calculation unit 31A calculates object features related to a target object, such as the number of target objects for state determination, the position of the object and the moving speed of the object, from the "image" contained in the acquired target image data. Then, the object feature calculation unit 31A outputs the calculated object features collectively as one feature vector (Step S211).

Next, the imaged space feature calculation unit 61B extracts rectangular regions of objects other than a target object of state determination from the "image" contained in the acquired target image data and the "imaging time" of the image, and calculates features related to the space being imaged, such as an object other than a target object of state determination, the position of the object, the moving speed of the object, a feature related to the weather, and a feature related to the imaging time, for each of the extracted rectangular regions. Then, the imaged space feature calculation unit 61B collects the features calculated for each rectangular region as one feature vector (Step S212).

Then, the co-occurrence calculation unit 62A reads cluster information made up of cluster IDs and cluster center vectors and the probability of co-occurrence between clusters stored in the storage device 70 (Step S213).

The co-occurrence calculation unit 62A then calculates a cluster to which the object feature output from the object feature calculation unit 31A belongs, the object feature having a high probability of co-occurrence with the cluster to which the imaged space feature of the target image data output from the imaged space feature calculation unit 61B in Step S212 belongs, by using the cluster information and the probability of co-occurrence read in Step S213, and decides a feature that is the cluster center as a feature of the reference state (Step S214).

Finally, the state determination device 80 determines whether it is a state different from the reference state or the same state as the reference state on the basis of a difference between the feature of the reference state output from the co-occurrence calculation unit 62A in Step S214 and the object feature in the target image data output from the object feature calculation unit 31A in Step S211 (Step S215). The determined state is output to an output device (a display device, for example), which is not shown.

As described above, according to the third example embodiment, the reference state deciding device 60 calculates a cluster to which the object feature belongs, the object feature having a high probability of co-occurrence with a cluster to which the imaged space feature of the target image data belongs, on the basis of the past image data, and decides a feature that is the cluster center as a feature of the reference state. The state determination device 80 determines whether the current state of the target object is different from or the same as the reference state by using the feature of the reference state calculated by the reference state deciding device 60 and the object feature of the target image data.

The same effects as in the second example embodiment are obtained also in the above-described configuration of the reference state deciding device 60. Specifically, this configuration allows deciding a reference state suitable for the situation of a space being imaged in consideration of the co-occurrence between a feature of a target object of state determination and a feature of the space being imaged, which improves the accuracy of state determination of the object shown in the image.

Further, the second example embodiment and the third example embodiment may be combined. For example, a state may be decided in a comprehensive manner from the states determined by the state determination device 50 and the state determination device 80 in the respective example embodiments, or features of the reference state obtained by the similarity calculation unit 32B and the co-occurrence calculation unit 62A in the respective example embodiments may be combined as one feature and defined as a feature of the reference state, and a determination by the state determination device may be made.

Other Example Embodiment

Figure 12:
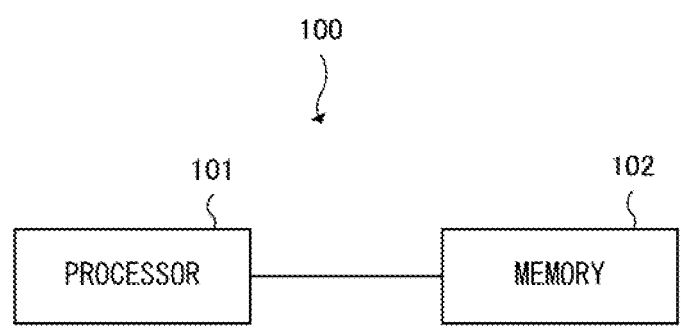
FIG. 12 is a view showing a hardware configuration example of a reference state deciding device according to an example embodiment.

FIG. 12 is a view showing a hardware configuration example of a reference state deciding device. In FIG. 12, a reference state deciding device 100 includes a processor 101 and a memory 102. The processor 101 may be a microprocessor, an MPU (Micro Processing Unit) or a CPU (Central Processing Unit), for example. The processor 101 may include a plurality of processors. The memory 102 is a combination of a volatile memory and a nonvolatile memory. The memory 102 may include a storage that is placed apart from the processor 101. In this case, the processor 101 may access the memory 102 through an I/O interface, which is not shown.

Each of the reference state deciding devices 10, 30 and 60 according to the first to third example embodiments may have the hardware configuration shown in FIG. 12. The feature calculation units 11, 31 and 61 and the reference state deciding units 12, 32 and 62 of the reference state deciding devices 10, 30 and 60 according to the first to third example embodiments may be implemented by reading and executing, by the processor 101, a program stored in the memory 102. In the case where the storage devices 40 and 70 are included in the reference state deciding devices 30 and 60, respectively, the storage devices 40 and 70 may be implemented by the memory 102. The program may be stored using various types of non-transitory computer readable media and supplied to the reference state deciding devices 10, 30 and 60. Examples of non-transitory computer readable media include magnetic storage media (such as flexible disks, magnetic tapes, hard disk drives, etc.), and optical magnetic storage media (e.g. magneto-optical disks). Examples of non-transitory computer readable media further include CD-ROM (Read Only Memory), CD-R, and CD-R/W. Examples of non-transitory computer readable media further include semiconductor memories. The semiconductor memories include mask ROM, PROM (Programmable ROM), EPROM (Erasable PROM), flash ROM, and RAM (Random Access Memory). The program may be provided to the reference state deciding devices 10, 30 and 60 using various types of transitory computer readable media. Examples of transitory computer readable media include electric signals, optical signals, and electromagnetic waves. Transitory computer readable media can provide the program to the reference state deciding devices 10, 30 and 60 via a wired communication line such as an electric wire or an optical fiber, or a wireless communication line.

Although the present disclosure is described above with reference to the example embodiments, the present disclosure is not limited to the above-described example embodiments. Various changes and modifications as would be obvious to one skilled in the art may be made to the structure and the details of the present disclosure without departing from the scope of the disclosure.

The whole or part of the example embodiments disclosed above can be described as, but not limited to, the following supplementary notes.

Supplementary Note 1

A reference state deciding device comprising:
a feature calculation means for calculating an object feature related to a target object of state determination included in a real space and an imaged space feature related to the real space on the basis of past image data of the real space imaged in the past and target image data of the real space imaged at the time of the state determination; and
a reference state deciding means for deciding a reference state to be used for the state determination on the basis of a relation between the object feature and the imaged space feature calculated from the past image data and the target image data.

Supplementary Note 2

The reference state deciding device according to Supplementary Note 1, wherein the reference state deciding means decides the reference state on the basis of a correlation between the object feature and the imaged space feature.

Supplementary Note 3

The reference state deciding device according to Supplementary Note 2, wherein the reference state deciding means includes:
a correlation calculation means for calculating a projection matrix in a latent feature space on the basis of a correlation between the object feature and the imaged space feature in the past image data; and
a similarity calculation means for deciding a feature of the reference state on the basis of a similarity between a latent feature in the past image data and a latent feature in the target image data obtained by the projection matrix.

Supplementary Note 4

The reference state deciding device according to Supplementary Note 3, wherein the correlation calculation means calculates the projection matrix in a latent feature space that maximizes a correlation coefficient between the object feature and the imaged space feature.

Supplementary Note 5

The reference state deciding device according to Supplementary Note 3 or 4, wherein the similarity calculation means decides a feature of the reference state on the basis of a similarity between a latent feature of the object feature and the imaged space feature in the past image data and a latent feature of the imaged space feature in the target image data.

Supplementary Note 6

The reference state deciding device according to any one of Supplementary Notes 3 to 5, wherein the similarity calculation means decides a feature of the reference state on the basis of a similarity between a cluster in a latent feature space of a latent feature in the past image data and a latent feature in the target image data.

Supplementary Note 7

The reference state deciding device according to Supplementary Note 6, wherein the similarity calculation means decides a feature of the reference state on the basis of a similarity of a cluster center of the cluster.

Supplementary Note 8

The reference state deciding device according to Supplementary Note 1, wherein the reference state deciding means decides the reference state on the basis of co-occurrence of the object feature and the imaged space feature.

Supplementary Note 9

The reference state deciding device according to Supplementary Note 8, wherein the reference state deciding means calculates a probability of a co-occurrence of n the object feature and the imaged space feature in the past image data, and decides a feature of the reference state by the object feature corresponding to the imaged space feature in the target image data based on the probability of the co-occurrence.

Supplementary Note 10

The reference state deciding device according to Supplementary Note 9, wherein the reference state deciding means calculates the probability of a co-occurrence between a cluster of the object feature and a cluster of the imaged space feature in the past image data.

Supplementary Note 11

The reference state deciding device according to Supplementary Note 10, wherein the reference state deciding means decides a feature of the reference state on the basis of a cluster to which the object feature belongs that is selected on the basis of the probability of co-occurrence from a cluster to which the imaged space feature belongs in the target image data.

Supplementary Note 12

The reference state deciding device according to Supplementary Note 11, wherein the reference state deciding means selects a cluster to which the object feature belongs and having the highest probability of co-occurrence with a cluster to which the imaged space feature belongs.

Supplementary Note 13

The reference state deciding device according to Supplementary Note 11 or 12, wherein the reference state deciding means decides that a feature serving as a cluster center of a cluster to which the object feature belongs is a feature of the reference state.

Supplementary Note 14

The reference state deciding device according to any one of Supplementary Notes 1 to 13, wherein
the past image data and the target image data contain an image of the real space and imaging time when the image is captured, and
the feature calculation means includes:
an object feature calculation means for calculating the object feature on the basis of images of the past image data and the target image data, and
an imaged space feature calculation means for calculating the imaged space feature on the basis of images and imaging time of the past image data and the target image data.

Supplementary Note 15

The reference state deciding device according to Supplementary Note 14, wherein the object feature calculation means calculates an object feature vector containing a plurality of features as the object feature.

Supplementary Note 16

The reference state deciding device according to Supplementary Note 15, wherein the object feature vector includes a feature related to any one of the number of target objects, a position of the target object, a moving speed of the target object, and an attribute of the target object.

Supplementary Note 17

The reference state deciding device according to any one of Supplementary Notes 14 to 16, wherein the imaged space feature calculation means calculates an imaged space feature vector containing a plurality of features as the imaged space feature.

Supplementary Note 18

The reference state deciding device according to Supplementary Note 17, wherein the imaged space feature vector includes a feature related to any one of a class of an another object other than the target object, an image feature calculated from a rectangular region including the another object, a position of the another object, a moving speed of the another object, weather of the real space, the imaging time, and an event in the real space.

Supplementary Note 19

A state determination system comprising:
a feature calculation means for calculating an object feature related to a target object of state determination included in a real space and an imaged space feature related to the real space on the basis of past image data of the real space imaged in the past and target image data of the real space imaged at the time of the state determination;
a reference state deciding means for deciding a reference state to be used for the state determination on the basis of a relation between the object feature and the imaged space feature calculated from the past image data and the target image data; and
a state determination means for determining a state of the target object on the basis of the decided reference state.

Supplementary Note 20

The state determination system according to Supplementary Note 19, wherein the state determination means determines a state of the target object on the basis of a difference between a feature of the decided reference state and an object feature of the target image data.

Supplementary Note 21

A reference state deciding method comprising:
calculating an object feature related to a target object of state determination included in a real space and an imaged space feature related to the real space on the basis of past image data of the real space imaged in the past and target image data of the real space imaged at the time of the state determination; and
deciding a reference state to be used for the state determination on the basis of a relation between the object feature and the imaged space feature calculated from the past image data and the target image data.

Supplementary Note 22

A non-transitory computer readable medium storing a program causing a computer to execute a process comprising:
calculating an object feature related to a target object of state determination included in a real space and an imaged space feature related to the real space on the basis of past image data of the real space imaged in the past and target image data of the real space imaged at the time of the state determination; and
deciding a reference state to be used for the state determination on the basis of a relation between the object feature and the imaged space feature calculated from the past image data and the target image data.

REFERENCE SIGNS LIST

1 REFERENCE STATE DECIDING SYSTEM
2 REFERENCE STATE DECIDING SYSTEM
3 REFERENCE STATE DECIDING SYSTEM
10 REFERENCE STATE DECIDING DEVICE
11 FEATURE CALCULATION UNIT
12 REFERENCE STATE DECIDING UNIT
20 STATE DETERMINATION DEVICE
30 REFERENCE STATE DECIDING DEVICE
31 FEATURE CALCULATION UNIT
31A OBJECT FEATURE CALCULATION UNIT
31B IMAGED SPACE FEATURE CALCULATION UNIT
32 REFERENCE STATE DECIDING UNIT
32A CORRELATION CALCULATION UNIT
32B SIMILARITY CALCULATION UNIT
40 STORAGE DEVICE
50 STATE DETERMINATION DEVICE
60 REFERENCE STATE DECIDING DEVICE
61 FEATURE CALCULATION UNIT
61B IMAGED SPACE FEATURE CALCULATION UNIT
62 REFERENCE STATE DECIDING UNIT
62A CO-OCCURRENCE CALCULATION UNIT
70 STORAGE DEVICE
80 STATE DETERMINATION DEVICE

What is claimed is:

1. A reference state deciding method comprising:
calculating an object feature related to a target object of state determination included in a real space and an imaged space feature related to the real space on the basis of past image data of the real space imaged in the past and target image data of the real space imaged at a time of the state determination; and
deciding a reference state to be used for the state determination on the basis of a relation between the object feature and the imaged space feature calculated from the past image data and the target image data,
wherein the deciding the reference state includes:
calculating a projection matrix in a latent feature space on the basis of a correlation between the object feature and the imaged space feature in the past image data; and
deciding a feature of the reference state on the basis of a similarity between a latent feature in the past image data and a latent feature in the target image data obtained by the projection matrix.

2. A non-transitory computer readable medium storing a program causing a computer to execute a process comprising:
calculating an object feature related to a target object of state determination included in a real space and an imaged space feature related to the real space on the basis of past image data of the real space imaged in the past and target image data of the real space imaged at a time of the state determination; and
deciding a reference state to be used for the state determination on the basis of a relation between the object feature and the imaged space feature calculated from the past image data and the target image data,
wherein the deciding the reference state includes:
calculating a projection matrix in a latent feature space on the basis of a correlation between the object feature and the imaged space feature in the past image data; and
deciding a feature of the reference state on the basis of a similarity between a latent feature in the past image data and a latent feature in the target image data obtained by the projection matrix.

3. A reference state deciding device comprising:
one or more memories storing instructions; and
one or more processors configured to execute the instructions to:
calculate an object feature related to a target object of state determination included in a real space and an imaged space feature related to the real space on the basis of past image data of the real space imaged in the past and target image data of the real space imaged at a time of the state determination; and
decide a reference state to be used for the state determination on the basis of a relation between the object feature and the imaged space feature calculated from the past image data and the target image data,
wherein the one or more processors, in deciding the reference state:
calculate a projection matrix in a latent feature space on the basis of a correlation between the object feature and the imaged space feature in the past image data; and
decide a feature of the reference state on the basis of a similarity between a latent feature in the past image data and a latent feature in the target image data obtained by the projection matrix.

4. The reference state deciding device according to claim 3, wherein the one or more processors, in calculating the object feature, calculate the projection matrix in a latent feature space that maximizes a correlation coefficient between the object feature and the imaged space feature.

5. The reference state deciding device according to claim 3, wherein the one or more processors, in deciding a feature of the reference state, decide a feature of the reference state on the basis of a similarity between a latent feature of the object feature and the imaged space feature in the past image data and a latent feature of the imaged space feature in the target image data.

6. The reference state deciding device according to claim 3, wherein the one or more processors, in deciding a feature of the reference state, decide a feature of the reference state on the basis of a similarity between a cluster in a latent feature space of a latent feature in the past image data and a latent feature in the target image data.

7. The reference state deciding device according to claim 6, wherein the one or more processors, in deciding a feature of the reference state, decide a feature of the reference state on the basis of a similarity of a cluster center of the cluster.

8. The reference state deciding device according to claim 3, wherein the one or more processors, in deciding the reference state, decide the reference state on the basis of co-occurrence of the object feature and the imaged space feature.

9. The reference state deciding device according to claim 8, wherein the one or more processors, in deciding the reference state, calculate a probability of a co-occurrence of the object feature and the imaged space feature in the past image data, and decide a feature of the reference state by the object feature corresponding to the imaged space feature in the target image data based on the probability of the co-occurrence.

10. The reference state deciding device according to claim 9, wherein the one or more processors, in deciding the reference state, calculate a probability of a co-occurrence between a cluster of the object feature and a cluster of the imaged space feature in the past image data.

11. The reference state deciding device according to claim 10, wherein the one or more processors, in deciding the reference state, decide a feature of the reference state on the basis of a cluster to which the object feature belongs that is selected on the basis of a probability of co-occurrence from a cluster to which the imaged space feature belongs in the target image data.

12. The reference state deciding device according to claim 11, wherein the one or more processors, in deciding the reference state, select a cluster to which the object feature belongs and that has a highest probability of co-occurrence with a cluster to which the imaged space feature belongs.

13. The reference state deciding device according to claim 11, wherein the one or more processors, in deciding the reference state, decide that a feature serving as a cluster center of a cluster to which the object feature belongs is a feature of the reference state.

14. The reference state deciding device according to claim 3, wherein
the past image data and the target image data each contain an image of the real space and an imaging time when the image is captured, and
the one or more processor, in calculating the object feature:
calculate the object feature on the basis of images of the past image data and the target image data, and
calculate the imaged space feature on the basis of images and imaging times of the past image data and the target image data.

15. The reference state deciding device according to claim 14, wherein the one or more processors, in calculating the object feature, calculate an object feature vector containing a plurality of features as the object feature.

16. The reference state deciding device according to claim 15, wherein the object feature vector includes a feature related to any one of a number of target objects, a position of the target object, a moving speed of the target object, and an attribute of the target object.

17. The reference state deciding device according to claim 14, wherein the one or more processors, in calculating the imaged space feature, calculate an imaged space feature vector containing a plurality of features as the imaged space feature.

18. The reference state deciding device according to claim 17, wherein the imaged space feature vector includes a feature related to any one of a class of an another object other than the target object, an image feature calculated from a rectangular region including the another object, a position of the another object, a moving speed of the another object, weather of the real space, an imaging time, and an event in the real space.

* * * * *